(12) United States Patent
Suzuki

(10) Patent No.: US 8,630,395 B2
(45) Date of Patent: Jan. 14, 2014

(54) SYSTEM, METHOD AND DEVICE FOR MULTIUSER COMMUNICATION

(75) Inventor: Yoshihiro Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 81 days.

(21) Appl. No.: 13/001,540

(22) PCT Filed: Sep. 6, 2010

(86) PCT No.: PCT/JP2010/065230
§ 371 (c)(1),
(2), (4) Date: Feb. 11, 2011

(87) PCT Pub. No.: WO2012/032592
PCT Pub. Date: Mar. 15, 2012

(65) Prior Publication Data
US 2012/0147126 A1    Jun. 14, 2012

(51) Int. Cl.
*H04M 11/00*    (2006.01)
(52) U.S. Cl.
USPC ..................... 379/93.21; 379/93.23
(58) Field of Classification Search
USPC ................. 379/93.21, 158, 202.01, 203.01, 379/205.01, 93.23
See application file for complete search history.

(56) References Cited

U.S. PATENT DOCUMENTS

| 2005/0198578 A1 | 9/2005 | Agrawala et al. |
| 2007/0133774 A1 | 6/2007 | Fujimoto |
| 2007/0233783 A1 | 10/2007 | Tanimoto |
| 2010/0115052 A1* | 5/2010 | Ishii .............................. 709/217 |

FOREIGN PATENT DOCUMENTS

| JP | 10-004406 | 1/1998 |
| JP | 2000-194875 | 7/2000 |
| JP | 2005-222535 | 8/2005 |
| JP | 2007-104354 | 4/2007 |
| JP | 2007-281552 | 10/2007 |
| JP | 2008-152625 | 7/2008 |
| JP | 2009-212657 | 9/2009 |

* cited by examiner

*Primary Examiner* — Olisa Anwah
(74) *Attorney, Agent, or Firm* — Morgan, Lewis & Bockius LLP

(57) ABSTRACT

A moderator terminal device (201) managing display data transmits, to a display device (10) through a network (30), html fragmentation information for a remark (first information) including a data ID for identifying the display data and position information indicating the display position of the display data. A data line (40) is opened between the display device (10) and a user terminal device (202). The display device (10) transmits, to the user terminal device (202) through the network (30), html fragmentation information for a remark (second information) including a stream ID for identifying the data line (40) and the data ID. The user terminal device (202) transmits the display data to the display device (10) through the data line (40) identified by the stream ID. The display device (10) displays the display data on a display portion (11) based on the stream ID, the data ID and the position information.

41 Claims, 12 Drawing Sheets

FIG.8A

```
<div style="position: absolute, top: 10px, left: 10px, z-index: 1", id=122,
creation-date=2010-01-21T10:33Z, update-date=2010-01-21T10:45Z,
owner=nick, access=nick only>
Meeting for next annual budget
</div>
```

FIG.8B

```
<div style="position: absolute, top: 10px, left: 10px, z-index: 1", id=121,
owner=nick, access=nick only>
<video sid=82649/>
</div>
```

FIG.8C

```
<div style="position: absolute, top: 10px, left: 10px, z-index: 1", id=121,
owner=nick, access=nick only>
<audio sid=71538/>
</div>
```

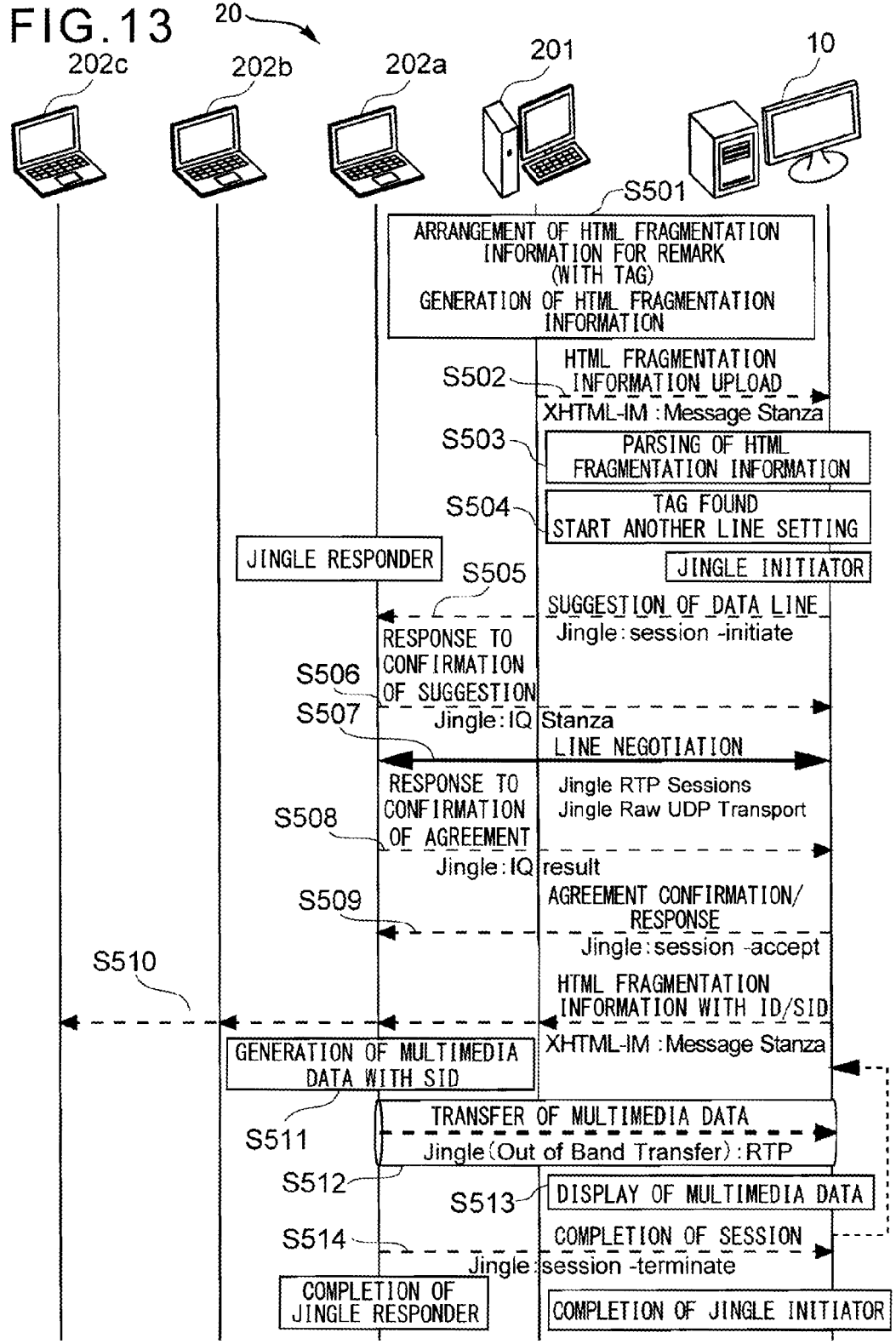

SYSTEM, METHOD AND DEVICE FOR MULTIUSER COMMUNICATION

TECHNICAL FIELD

The present invention relates to a communication method, a display device, a user terminal device, a moderator terminal device and a multiuser communication system provided therewith.

BACKGROUND ART

Conventionally, a communication system is utilized in which a plurality of information terminal devices are interconnected through a network and in which users who use those information terminal devices share information exchanged through the network. Examples thereof include, for example, an electronic conference system that achieves an imaginary conference room by connecting a plurality of personal computers through a network and sharing information on materials, the position of a displayed page, notes and the like.

This electronic conference system uses a method of displaying the display screen of a predetermined personal computer on a screen and thus performing conference proceedings, information transmission, questions and answers and the like.

For example, patent document 1 discloses a technology with which a large number of individuals participating in a conference or the like can share information displayed on a display device. In this technology, various communication modalities of data input from an input device are processed by an input module, and then the resulting data is converted into a form that can be displayed on the display device and is displayed on the display device.

Patent document 2 discloses an electronic conference system in which all users at terminal devices can see the same shared information. In this electronic conference system, a client terminal receives an operation input from a user and then transmits the operation input to a server through a network, and the server writes the operation input in a texture of a 3D layer object arranged within a virtual space and transmits vide information to the client terminal. Then, the client terminal displays the video information transmitted from the server.

RELATED ART DOCUMENT

Patent Document

[Patent document 1] JP-A-2005-222535
[Patent document 2] JP-A-2000-194875

DISCLOSURE OF THE INVENTION

Problems to be Solved by the Invention

In the technologies disclosed in patent documents 1 and 2 described above, text data and data such as moving image data or voice data whose transmission characteristics are different from each other are exchanged through the same communication path without the types of data exchanged between devices being distinguished. However, in this case, those types of data whose transmission characteristics are different interfere with each other, and thus transfer fluctuations and the like are produced, with the result that data may fail to be accurately transferred.

The present invention is designed in view of the foregoing problem; an object of the present invention is to provide a communication method, a display device, a user terminal device, a moderator terminal device and a multiuser communication system provided therewith which it is possible to easily, efficiently and accurately transfer data transmitted from a plurality of users and achieve a structured display on a display screen.

Means for Solving the Problem

To achieve the above object, according to the present invention, there is provided a communication method in which a plurality of users participate in communication and display data transmitted to a display device from information terminal devices used by the plurality of users is displayed on a display portion of the display device, and the information terminal devices includes a user terminal device transmitting the display data to the display device and a moderator terminal device managing the display data. The communication method includes: transmitting, by the moderator terminal device, to the display device through a network, first information including data ID information for identifying the display data and position information indicating a display position of the display data on the display portion; opening a data communication path, between the display device and the user terminal device, through which the display data is transmitted; transmitting, by the display device, to the user terminal device through the network, second information including communication path identification information for identifying the data communication path and the data ID information; transmitting, by the user terminal device, the display data to the display device through the data communication path identified by the communication path identification information; and displaying, by the display device, the display data on the display portion based on the communication path identification information, the data ID information and the position information.

According to the communication method configured as described above, in a communication method in which a plurality of users participate in communication and the display data presented from the information terminal devices used by the users is displayed on the display portion of the display device, when the display device receives, from the moderator terminal device managing the display data, the data ID information for identifying the display data and the position information indicating the position where the display data is displayed, the data communication path separate from the network is opened between the user terminal device transmitting the display data and the display device. Then, the display device transmits the communication path identification information for identifying the opened data communication path to the user terminal device through the network. Hence, the user terminal device can transmit the display data to the display device through the data communication path identified by the communication path identification information. As described above, the display data is transmitted from the user terminal device to the display device through the dedicated data communication path separate from the network. Hence, even when data exchanged through the network and the display data transmitted through the data communication path differ from each other in transmission characteristics, they do not interfere with each other, and thus it is possible to prevent the occurrence of transfer fluctuations and the like that cause variations in data transfer rate and data reception interval. It is therefore possible to easily, efficiently and accurately transfer the display data from the user terminal device to the display device. Moreover, through the data ID information, the display device can associate the display data received through the data communication path identified by the communication path identification information with the position information and can also display the display data in the display position on the display portion indicated by the position information. Therefore, the display device can structure and display the display data transmitted through the dedicated data communication path in the display screen on the display portion.

The user using the moderator terminal device can reliably and easily manage, through the data ID information and the position information, the display data transmitted from the user terminal device to the display device through the dedicated data communication path separate from the network and the display position of the display data on the display portion of the display device. Since the display data is directly transferred from the user terminal device to the display device through the data communication path, the data communication path is prevented from being utilized by the terminal devices other than the user terminal device and the display device, and the display data exchanged through the data communication path is prevented from being acquired or changed. It is therefore possible to enhance the security for the data transfer through the data communication path.

In the communication method configured as described above, the data communication path may be a logical communication path through which the display data is transmitted. The logical communication path refers to an imaginary communication line (logical line) in logical terms that is included in a communication line in physical terms. For example, even when only one communication line is physically present, a plurality of logical lines can be set. Data communication that differs from one logical line to another can be performed.

With this configuration, when the data communication path through which the display data is directly transmitted is opened between the display device and the user terminal device, it is not necessary to provide a physical communication line separate from the network. Specifically, a new logical communication path (logical line) separate from the network is provided in the physical communication line through which the network passes, and thus it is possible to exchange the display data through the logical line that is logically separate from the network. Hence, since data exchanged through the network and the display data transmitted through the logical line do not interfere with each other, it is possible to prevent the occurrence of transfer fluctuations and the like that cause variations in data transfer rate and data reception interval. It is therefore possible to more easily, efficiently and accurately transfer the display data from the user terminal device to the display device.

In the communication method configured as described above, the display data may be multimedia data in a format other than text format. With this configuration, multimedia data, such as moving image data or voice data, in a format other than text format can be transmitted from the user terminal device to the display device through the dedicated data communication path separate from the network. Hence, even when data (such as text data) exchanged through the network and the display data (multimedia data in a format other than text format) transmitted through the data communication path differ from each other in transmission characteristics, they do not interfere with each other, and thus it is possible to prevent the occurrence of transfer fluctuations and the like that cause variations in data transfer rate and data reception interval. It is therefore possible to more easily, efficiently and accurately transfer the multimedia data in a format other than text format from the user terminal device to the display device. The display device can associate, through the data ID information, the multimedia data received through the data communication path identified by the communication path identification information with the position information, and can further display the multimedia data in the display position on the display portion indicated by the position information. Therefore, the display device can structure and display the multimedia data received through the dedicated data communication path in the display screen on the display portion.

In the communication method configured as described above, the moderator terminal device may transmit, to the display device through the network, the first information including the data ID information, the position information and access right information that is set for each of the users using the information terminal devices and that indicates whether to permit generation and change of the display data, and the data communication path through which the display data is transmitted may be opened between the display device and a user terminal device used by the user indicated by the access right information.

Alternatively, in the communication method configured as described above, the moderator terminal device may transmit, to the display device through the network, the first information including the data ID information, the position information and user information indicating a user who is an owner of the display data, and the data communication path through which the display data is transmitted may be opened between the display device and a user terminal device used by the user indicated by the user information.

With this configuration, the direct communication path through which the display data is transmitted is opened between the user terminal device used by the user indicated by the access right information or the user information transmitted from the moderator terminal device and the display device. Hence, it is unnecessary to provide a meshed communication path network in order to share information between the display device and the information terminal devices; as necessary, the direct data communication path is only opened between the display device and the user terminal device that transmits the display data. The display device can associate, through the data ID information, the display data received through the data communication path with the position information, and can display the display data in the display position on the display portion indicated by the position information. Since, through the access right information or the user information transmitted to the display device, the moderator terminal device can indicate to the display device which of the user terminal devices the data communication path should be opened with, the moderator terminal device can control the opening of the data communication path between the display device and the user terminal device.

In the communication method configured as described above, the moderator terminal device may transmit, to the display device through the network, the first information including the data ID information, the position information, access right information that is set for each of the users using the information terminal devices and that indicates whether to permit generation and change of the display data and user information indicating a user who is an owner of the display data, and the display device may display the display data on the display portion based on the communication path identification information, the data ID information, the position information, the user information and the access right information.

With this configuration, the display device can associate, through the data ID information, the display data received through the data communication path identified by the communication path identification information with the user information, the access right information and the position information received from the moderator terminal device, determine, based on the user information and the access right information, whether to display the display data identified by the data ID information and display the display data in the display position on the display portion indicated by the position information. Hence, the display data transferred from the user terminal device is managed by the data ID information, and, with respect to the display data, individual pieces of display data displayed on the display portion of the display device are controlled according to the access right (that is, whether to permit the generation and the change of the display data) set for each of the users who use the information terminal devices. It is therefore possible to achieve smooth communication between a plurality of users based on their access rights.

In the communication method configured as described above, when the user indicated by the access right information and permitted to generate and change the display data agrees with the user indicated by the user information, the display device may display the display data on the display portion based on the communication path identification information, the data ID information and the position information.

With this configuration, only when the user who is the owner of the display data identified by the data ID information agrees with the user who has the access right (that is, whether to permit the generation and the change of the display data) for the display data, the display device can display the display data on the display portion. Specifically, the display device uses the data ID information to identify the display data received through the data communication path identified by the communication path identification information, and displays the identified display data in the display position on the display portion indicated by the position information. It is therefore possible to achieve smooth communication between a plurality of users based on their access rights.

The communication method configured as described above may be a communication method performed in an electronic conference in which the plurality of users participate. With this configuration, it is possible not only to reliably and easily manage, through the data ID information, remarks (display data) presented to an imaginary conference room (that is, the electronic conference system) but also to control the remarks (display data) presented to the imaginary conference room according to the access right (that is, whether to permit the presentation and the modification of the remarks (display data)) that is set for each of the participants (users) participating in the imaginary conference room. It is therefore possible to achieve smooth communication between a plurality of users based on their access rights.

In the communication method configured as described above, the display device and the information terminal devices may communicate with each other in accordance with XMPP (extensible messaging and presence protocol). With this configuration, it is therefore possible not only to perform real-time messaging (information exchange) between the display device and the information terminal devices (the moderator terminal device and the user terminal devices) but also to easily and reliably associate, through the data ID information, the data on which the messaging is performed in accordance with XMPP with the display data displayed on the display portion of the display device.

XMPP is an XML-based protocol, which is standardized by XSF (XMPP standards foundation), which is separated from the XMPP working group of IETF (internet engineering task force). XMPP dynamically controls a wide range of applications including an instant message, presence ("what is the state of the party on the other end at present"), a multi-user chat, a voice or television telephone, a coordination task, content syndication and generalized routing on XML data; in order to perform real-time communication in a communication system such as the Internet, XMPP is composed of a plurality of extension protocols (XEP: XMPP Extension Protocol) that are standardized according to the purposes thereof.

In the communication method configured as described above, the opening of the data communication path between the display device and the user terminal device and the transmission of the display data from the user terminal device to the display device through the data communication path may be performed in accordance with at least one protocol of XEP-0166 (Jingle), XEP-0167 (Jingle RTP Sessions) and XEP-0177 (Jingle Raw UDP Transport) among XMPP. With this configuration, even when NAT (network address translation) or a firewall is arranged in the networks between the display device and the user terminal devices, since the display data is transmitted through a data communication path separate from the networks, it is possible to reliably transfer the display data through the data communication path without being affected such as by the interruption of the data transfer.

XEP-0166 (Jingle) is a protocol that specifies the function of establishing a communication path through which to exchange data between two communication-capable terminal devices. Examples of protocols related to Jingle described above include XEP-0167 (Jingle RTP Sessions) and XEP-0177 (Jingle Raw UDP Transport Method). XEP-0167 is a protocol that specifies the function of establishing a communication path through which to exchange data such as voice data or moving image data in a streaming mode, using RTP (Real-time Transport Protocol). XEP-0177 (Jingle Raw UDP Transport Method) is a protocol that defines the exchange of data, utilizing UDP (User Datagram Protocol).

In the communication method configured as described above, the first information and the second information may be an html file (hyper text markup language) obtained by extending meta information. Here, the html file obtained by extending the meta information refers to data in a format that can be expressed by html compatible to the communication in accordance with XMPP, and the data includes meta information that is information (attribute information) related to the display data transferred through the data communication path opened between the display device and the user terminal device. As the meta information, the attribute information, such as the data ID information, the position information, the communication path identification information, the access right information and the user information, that corresponds to the messaging in accordance with XMPP is included. Utilizing, as meta information, the attribute information (such as the data ID information, the position information, the communication path identification information, the access right information and the user information) that corresponds to the messaging in accordance with XMPP is referred to as the extension.

With this configuration, it is possible to map the meta information (such as the data ID information, the position information, the communication path identification information, the user information and the access right information) included in the first and second information onto description in html format utilized in a web browser. Specifically, it is possible to make the meta information (such as the data ID information, the position information, the communication path identification information, the user information and the access right information) included in the first and second information correspond to the display elements of html. Thus, it is possible to connect the messaging in accordance with XMPP to web and html.

In the communication method configured as described above, the first information and the second information may be fragmentation information constituting display information for producing a display on the display portion of the display device. With this configuration, for example, when the information terminal devices (the moderator terminal device and the user terminal devices) change part of information included in the display information for producing a display on the display portion of the display device, if fragmentation information including the changed information is only transmitted, the display device can modify the display information for producing a display on the display portion based on the received fragmentation information. In other words, it is unnecessary to transmit the entire display information. Thus, since the amount of information exchanged between the display device and the information terminal devices (the moderator terminal device and the user terminal devices) can be reduced, it is possible not only to reduce the time necessary for communication but also to significantly reduce a burden imposed on the networks between the display device and the information terminal devices (the moderator terminal device and the user terminal devices). It is therefore possible for a plurality of users participating in the communication to perform more convenient communication.

To achieve the above object, according to the present invention, there is provided a display device including: a display portion displaying display data; a communication portion communicating through a network with a plurality of information terminal devices including a moderator terminal device managing the display data and a user terminal device transmitting the display data; and a control portion that opens a data communication path through which the display data is transmitted between the communication portion and the user terminal device when the communication portion receives, from the moderator terminal device through the network, first information including data ID information for identifying the display data and position information indicating a display position of the display data on the display portion. In the display device, the communication portion transmits, to the user terminal device through the network, second information including communication path identification information for identifying the data communication path and the data ID information, and the display portion displays the display data received by the communication portion from the user terminal device through the data communication path identified by the communication path identification information based on the communication path identification information, the data ID information and the position information.

With the display device configured as described above, when the display device receives, from the moderator terminal device managing the display data, the data ID information for identifying the display data and the position information indicating the position where the display data is displayed, the data communication path separate from the network is opened between the user terminal device transmitting the display data and the display device. Then, the display device transmits the communication path identification information for identifying the opened data communication path to the user terminal device through the network. Hence, the user terminal device can transmit the display data to the display device through the data communication path identified by the communication path identification information. As described above, the display data is transmitted from the user terminal device to the display device through the dedicated data communication path separate from the network. Hence, even when data exchanged through the network and the display data transmitted through the data communication path differ from each other in transmission characteristics, they do not interfere with each other, and thus it is possible to prevent the occurrence of transfer fluctuations and the like that cause variations in data transfer rate and data reception interval. It is therefore possible to easily, efficiently and accurately transfer the display data from the user terminal device to the display device. Moreover, through the data ID information, the display device can associate the display data received through the data communication path identified by the communication path identification information with the position information and can also display the display data in the display position on the display portion indicated by the position information. Therefore, the display device can structure and display the display data transmitted through the dedicated data communication path in the display screen on the display portion.

Since the display data is directly transferred from the user terminal device to the display device through the data communication path, the data communication path is prevented from being utilized by the terminal devices other than the user terminal device and the display device, and the display data exchanged through the data communication path is prevented from being acquired or changed. It is therefore possible to enhance the security for the data transfer through the data communication path.

In the display device configured as described, the data communication path may be a logical communication path through which the display data is transmitted. With this configuration, when the data communication path through which the display data is directly transmitted is opened between the display device and the information terminal device, it is not necessary to provide a physical communication line separate from the network. Specifically, a new logical communication path (logical line) separate from the network is provided in the physical communication line through which the network passes, and thus it is possible to exchange the display data through the logical line that is logically separate from the network. Hence, since data exchanged through the network and the display data transmitted through the logical line do not interfere with each other, it is possible to prevent the occurrence of transfer fluctuations and the like that cause variations in data transfer rate and data reception interval. It is therefore possible to more easily, efficiently and accurately transfer the display data from the user terminal device to the display device.

In the display device configured as described, the display data may be multimedia data in a format other than text format. With this configuration, even when multimedia data, such as moving image data or voice data, in a format other than text format is transmitted from the user terminal device to the display device, the multimedia data is transmitted through the dedicated data communication path separate from the network. Hence, even when data (such as text data) exchanged through the network and the display data (multimedia data in a format other than text format) transmitted through the data communication path differ from each other in transmission characteristics, they do not interfere with each other, and thus it is possible to prevent the occurrence of transfer fluctuations and the like that cause variations in data transfer rate and data reception interval. It is therefore possible for the display device to more easily, efficiently and accurately transfer the multimedia data, such as moving image data or voice data in a format other than text format from the user terminal device. The display device can associate, through the data ID information, the multimedia data received through the data communication path identified by the communication path identification information with the position information, and can further display the multimedia data in the display position on the display portion indicated by the position information. Therefore, the display device can structure and display the multimedia data received through the dedicated data communication path in the display screen on the display portion.

In the display device configured as described, when the communication portion receives, from the moderator terminal device through the network, the first information including the data ID information, the position information and access right information that is set for each of the users using the information terminal devices and that indicates whether to permit generation and change of the display data, the control portion may open the data communication path through which the display data is transmitted between the communication portion and a user terminal device used by the user indicated by the access right information.

Alternatively, in the display device configured as described, when the communication portion receives, from the moderator terminal device through the network, the first information including the data ID information, the position information and user information indicating a user who is an owner of the display data, the control portion may open the data communication path through which the display data is transmitted between the communication portion and a user terminal device used by the user indicated by the user right information.

With this configuration, the display device can open the direct communication path through which the display data is transmitted with the user terminal device used by the user indicated by the access right information or the user information transmitted from the moderator terminal device and the display device. Hence, it is unnecessary to provide a meshed communication path network in order to share information between the display device and the information terminal devices; as necessary, the data communication path is only opened between the display device and the user terminal device that transmits the display data. The display device can associate, through the data ID information, the display data received through the data communication path with the position information, and can display the display data in the display position on the display portion indicated by the position information.

In the display device configured as described, the communication portion may receive, from the moderator terminal device through the network, the first information including the data ID information, the position information, access right information that is set for each of the users using the information terminal devices and that indicates whether to permit generation and change of the display data and user information indicating a user who is an owner of the display data, and the display portion may display the display data based on the communication path identification information, the data ID information, the position information, the user information and the access right information.

With this configuration, the display device can associate, through the data ID information, the display data received through the data communication path identified by the communication path identification information with the user information, the access right information and the position information received from the moderator terminal device, determine, based on the user information and the access right information, whether to display the display data identified by the data ID information and display the display data in the display position on the display portion indicated by the position information. Hence, the display data transferred from the user terminal device is managed by the data ID information, and, with respect to the display data, individual pieces of display data displayed on the display portion of the display device are controlled according to the access right (that is, whether to permit the generation and the change of the display data) set for each of the users who use the information terminal devices. It is therefore possible to achieve smooth communication between a plurality of users based on their access rights.

In the display device configured as described, when the user indicated by the access right information and permitted to generate and change the display data agrees with the user indicated by the user information, the display portion may display the display data based on the communication path identification information, the data ID information and the position information.

With this configuration, the display device can associate, only when the user who is the owner of the display data identified by the data ID information agrees with the user who has the access right (that is, whether to permit the generation and the change of the display data) for the display data, the display device can display the display data on the display portion. Specifically, the display device uses the data ID information to identify the display data received through the data communication path identified by the communication path identification information, and displays the identified display data in the display position on the display portion indicated by the position information. It is therefore possible to achieve smooth communication between a plurality of users based on their access rights.

The display device configured as described may communicate with the information terminal devices in accordance with XMPP. With this configuration, it is therefore possible for the display device not only to perform real-time messaging (information exchange) between the information terminal devices (the moderator terminal device and the user terminal devices) but also to easily and reliably associate, through the data ID information, the data on which the messaging is performed in accordance with XMPP with the data displayed on the display portion.

In the display device configured as described, in accordance with at least one protocol of XEP-0166 (Jingle), XEP-0167 (Jingle RTP Sessions) and XEP-0177 (Jingle Raw UDP Transport) among XMPP, the control portion may open the data communication path between the communication portion and the user terminal device, and the communication portion may receive the display data from the user terminal device through the data communication path. With this configuration, even when NAT or a firewall is arranged in the networks between the display device and the user terminal devices, since the display data is transmitted through a data communication path separate from the networks, it is possible to reliably receive the display data through the data communication path without being affected such as by the interruption of the data transfer.

In the display device configured as described, the first information and the second information may be an html file obtained by extending meta information. Here, the html file obtained by extending the meta information refers to data in a format that can be expressed by html compatible to the communication in accordance with XMPP, and the data includes meta information that is information (attribute information) related to the display data transferred through the data communication path opened between the display device and the user terminal device. As the meta information, the attribute information, such as the data ID information, the position information, the communication path identification information, the access right information and the user information, that corresponds to the messaging in accordance with XMPP is included. Utilizing, as meta information, the attribute information (such as the data ID information, the position information, the communication path identification information, the access right information and the user information) that corresponds to the messaging in accordance with XMPP is referred to as the extension.

With this configuration, it is possible to map the meta information (such as the data ID information, the position information, the communication path identification information, the user information and the access right information) included in the first and second information onto description in html format utilized in a web browser. Specifically, it is possible to make the meta information (such as the data ID information, the position information, the communication path identification information, the user information and the access right information) included in the first and second information correspond to the display elements of html. Thus, it is possible to connect the messaging in accordance with XMPP to web and html.

In the display device configured as described, the first information and the second information may be fragmentation information constituting display information for producing a display on the display portion. With this configuration, for example, when the information terminal devices (the moderator terminal device and the user terminal devices) change part of information included in the display information for producing a display on the display portion of the display device, if fragmentation information including the changed information is only transmitted, the display device can modify the display information for producing a display on the display portion based on the received fragmentation information. In other words, it is unnecessary to transmit the entire display information. Thus, since the amount of information exchanged between the display device and the information terminal devices (the moderator terminal device and the user terminal devices) can be reduced, it is possible not only to reduce the time necessary for communication but also to significantly reduce a burden imposed on the networks between the display device and the information terminal devices (the moderator terminal device and the user terminal devices). It is therefore possible for a plurality of users participating in the communication to perform more convenient communication.

To achieve the above object, according to the present invention, there is provided a user terminal device including: a control portion opening a data communication path, with the display device, through which display data displayed on a display device is transmitted; and a communication portion transmitting the display data to the display device through the data communication path when second information including data ID information for identifying the display data and a communication path identification information for identifying the data communication path is received from the display device through a network.

With the user terminal device configured as described above, the data communication path, separate from the network, through which the display data is transmitted, is opened between the user terminal device and the display device, and the communication path identification information for identifying the data communication path is transmitted from the display device to the user terminal device. Thus, the user terminal device can transmit the display data to the display device through the data communication path identified by the communication path identification information. In this way, the user terminal device transmits the display data to the display device through the dedicated data communication path separate from the network. Hence, the user terminal device can transmit the display data to the display device through the data communication path identified by the communication path identification information. As described above, the display data is transmitted from the user terminal device to the display device through the dedicated data communication path separate from the network. Hence, even when data exchanged through the network and the display data transmitted through the data communication path differ from each other in transmission characteristics, they do not interfere with each other, and thus it is possible to prevent the occurrence of transfer fluctuations and the like that cause variations in data transfer rate and data reception interval. It is therefore possible to easily, efficiently and accurately transfer the display data from the user terminal device to the display device.

Since the display data is directly transmitted from the user terminal device to the display device through the data communication path, the data communication path is prevented from being utilized by the terminal devices other than the user terminal device and the display device, and the display data exchanged through the data communication path is prevented from being acquired or changed. It is therefore possible to enhance the security for the data transfer through the data communication path.

In the user terminal device configured as described above, the data communication path may be a logical communication path through which the display data displayed on the display device is transmitted. With this configuration, when the data communication path through which the display data is directly transmitted is opened between the user terminal device and the display device, it is not necessary to provide a physical communication line separate from the network. Specifically, a new logical communication path (logical line) separate from the network is provided in the physical communication line through which the network passes, and thus it is possible to transmit the display data through the logical line that is logically separate from the network. Hence, since data exchanged through the network and the display data transmitted through the logical line do not interfere with each other, it is possible to prevent the occurrence of transfer fluctuations and the like that cause variations in data transfer rate and data reception interval. It is therefore possible to more easily, efficiently and accurately transfer the display data from the user terminal device to the display device.

In the user terminal device configured as described above, the display data may be multimedia data in a format other than text format. With this configuration, even when the user terminal device transmits to the display device the multimedia data, such as moving image data or voice data, in a format other than text format, the multimedia data is transmitted through the dedicated data communication path separate from the network. Hence, even when data (such as text data) exchanged through the network and the display data (multimedia data in a format other than text format) transmitted through the data communication path differ from each other in transmission characteristics, they do not interfere with each other, and thus it is possible to prevent the occurrence of transfer fluctuations and the like that cause variations in data transfer rate and data reception interval. It is therefore possible to more easily, efficiently and accurately transfer the multimedia data in a format other than text format from the user terminal device to the display device.

In the user terminal device configured as described above, the communication portion may communicate with the display device in accordance with XMPP. With this configuration, it is therefore possible for the user terminal device not only to perform real-time messaging (information exchange) with the display device but also to easily and reliably associate, through the data ID information, the data on which the messaging is performed in accordance with XMPP with the display data transmitted to the display device.

In the user terminal device configured as described above, in accordance with at least one protocol of XEP-0166 (Jingle), XEP-0167 (Jingle RTP Sessions) and XEP-0177 (Jingle Raw UDP Transport) among XMPP, the control portion may open the data communication path identified by the communication path identification information between the communication portion and the display device, and the communication portion may transmit the display data to the display device through the data communication path. With this configuration, even when NAT or a firewall is arranged in the networks between the display device and the user terminal devices, since the user terminal device transmits the display data through a data communication path separate from the networks, it is possible to reliably transfer the display data without being affected such as by the interruption of the data transfer.

In the user terminal device configured as described above, the second information may be an html file obtained by extending meta information. Here, the html file obtained by extending the meta information refers to data in a format that can be expressed by html compatible to the communication in accordance with XMPP, and the data includes meta information that is information (attribute information) related to the display data transferred through the data communication path opened between the display device and the user terminal devices. As the meta information, the attribute information, such as the data ID information and the communication path identification information, that corresponds to the messaging in accordance with XMPP is included. With this configuration, it is possible to map the meta information (such as the data ID information and the communication path identification information) included in the second information onto description in html format utilized in a web browser. Specifically, it is possible to make the meta information (such as the data ID and the communication path identification information) included in the second information correspond to the display elements of html. Thus, it is possible to connect the messaging in accordance with XMPP to web and html.

In the user terminal device configured as described above, the second information may be fragmentation information constituting display information for producing a display on the display device. With this configuration, for example, when the user terminal device changes part of information included in the display information for producing a display on the display portion of the display device, if fragmentation information including the changed information is only transmitted, the display device can modify the display information for producing a display on the display portion based on the received fragmentation information. In other words, it is unnecessary to transmit the entire display information. Thus, since the amount of information transmitted from the user terminal device to the display device can be reduced, it is possible not only to reduce the time necessary for communication but also to significantly reduce a burden imposed on the network between the display device and the user terminal device. It is therefore possible for a plurality of users participating in the communication to perform more convenient communication.

To achieve the above object, according to the present invention, there is provided a moderator terminal device that manages display data transmitted from the user terminal device described above to the display device described above, and that includes: a control portion generating data ID information for identifying the display data and position information indicating a display position of the display data on a display portion of the display device; and a communication portion transmitting, to the display device through a network, first information including the data ID information and the position information.

With the moderator terminal device configured as described above, the display data easily, effectively and accurately transferred from the user terminal device to the display device is associated with the position information through the data ID information, and the display data is displayed in the display position on the display portion of the display device indicated by the position information. Hence, the user who uses the moderator terminal device can structure and display the display data transmitted from the user terminal device to the display device through the data communication path in the display screen on the display portion of the display device, and accurately and easily manage, through the data ID information and the position information, the display data transmitted from the user terminal device to the display device through the dedicated data communication path separate from the network and the display position of the display data on the display portion of the display device.

In the moderator terminal device configured as described above, the control portion may generate access right information that is set for each of users using a plurality of information terminal devices communicating with the display device and that indicates whether to permit generation and change of the display data, and the first information may further include the access right information.

Alternatively, in the moderator terminal device configured as described above, the control portion may generate user information indicating a user who is an owner of the display data, and the first information may further include the user information.

With this configuration, since, through the access right information or the user information transmitted to the display device, the moderator terminal device can indicate to the display device which of the user terminal devices the data communication path should be opened with, the moderator terminal device can control the opening of the data communication path between the display device and the user terminal device. Moreover, the display device can open the data communication path with the user terminal device used by the user indicated by the access right information or the user information transmitted from the moderator terminal device. Hence, it is unnecessary to provide a meshed communication path network in order to share information between the display device and the information terminal devices; as necessary, the data communication path is only opened between the display device and the user terminal device that transmits the display data.

In the moderator terminal device configured as described above, the communication portion may communicate with the display device in accordance with XMPP. With this configuration, it is possible for the moderator terminal device not only to perform real-time messaging (information exchange) with the display device but also to easily and reliably associate, through the data ID information, the data on which the messaging is performed in accordance with XMPP with the data displayed on the display portion of the display device.

In the moderator terminal device configured as described above, the first information may be an html file obtained by extending meta information. Here, the html file obtained by extending the meta information refers to data in a format that can be expressed by html (hyper text markup language) compatible to the communication in accordance with XMPP, and the data includes meta information that is information (attribute information) related to the display data transferred through the data communication path opened between the display device and the user terminal device. As the meta information, the attribute information, such as the data ID information, the position information, the access right information and the user information, that corresponds to the messaging in accordance with XMPP is included.

With this configuration, it is possible to map the meta information (such as the data ID information, the position information, the user information and the access right information) included in the first information onto description in html format utilized in a web browser. Specifically, it is possible to make the meta information (such as the data ID information, the position information, the user information and the access right information) included in the first information correspond to the display elements of html. Thus, it is possible to connect the messaging in accordance with XMPP to web and html.

In the moderator terminal device configured as described above, the first information may be fragmentation information constituting display information for producing a display on the display portion of the display device. With this configuration, for example, when the moderator terminal device generates and changes part of information included in the display information for producing a display on the display portion of the display device, if fragmentation information including the changed information is only transmitted, the display device can modify the display information for producing a display on the display portion based on the fragmentation information. In other words, it is unnecessary to transmit the entire display information. Thus, since the amount of information exchanged between the moderator terminal device and the display device can be reduced, it is possible not only to reduce the time necessary for communication but also to significantly reduce a burden imposed on the network between the display device and the moderator terminal device. It is therefore possible for a plurality of users participating in the communication to perform more convenient communication.

To achieve the above object, according to the present invention, there is provided a multiuser communication system in which a plurality of users participate in communication and display data transmitted from information terminal devices used by the plurality of users to the display device described above is displayed on the display device, and in which the information terminal devices include the user terminal device described above and the moderator terminal device described above.

With the multiuser communication system configured as described above, in a multiuser communication system in which a plurality of users participate in communication and the display data presented from the information terminal devices used by the users is displayed on the display portion of the display device, when the display device receives, from the moderator terminal device managing the display data, the data ID information for identifying the display data and the position information indicating the position where the display data is displayed, the data communication path separate from the network is opened between the user terminal device transmitting the display data and the display device. Then, the display device transmits the communication path identification information for identifying the opened data communication path to the user terminal device through the network. Hence, the user terminal device can transmit the display data to the display device through the data communication path identified by the communication path identification information. As described above, the display data is transmitted from the user terminal device to the display device through the dedicated data communication path separate from the network. Hence, even when data exchanged through the network and the display data transmitted through the data communication path differ from each other in transmission characteristics, they do not interfere with each other, and thus it is possible to prevent the occurrence of transfer fluctuations and the like that cause variations in data transfer rate and data reception interval. It is therefore possible to easily, efficiently and accurately transfer the display data from the user terminal device to the display device. Moreover, through the data ID information, the display device can associate the display data received through the data communication path identified by the communication path identification information with the position information and can also display the display data in the display position on the display portion indicated by the position information. Therefore, the display device can structure and display the display data transmitted through the dedicated data communication path in the display screen on the display portion.

The user using the moderator terminal device can reliably and easily manage, through the data ID information and the position information, the display data transmitted from the user terminal device to the display device through the dedicated data communication path separate from the network and the display position of the display data on the display portion of the display device. Since the display data is directly transferred from the user terminal device to the display device through the data communication path, the data communication path is prevented from being utilized by the terminal devices other than the user terminal device and the display device, and the display data exchanged through the data communication path is prevented from being acquired or changed. It is therefore possible to enhance the security for the data transfer through the data communication path.

In the multiuser communication system configured as described above, the display data may be multimedia data in a format other than text format. With this configuration, even when multimedia data, such as moving image data or voice data, in a format other than text format is transmitted from the user terminal device to the display device, the multimedia data is transmitted through the dedicated data communication path separate from the network. Hence, even when data (such as text data) exchanged through the network and the display data (multimedia data in a format other than text format) transmitted through the data communication path differ from each other in transmission characteristics, they do not interfere with each other, and thus it is possible to prevent the occurrence of transfer fluctuations and the like that cause variations in data transfer rate and data reception interval. It is therefore possible for the display device to more easily, efficiently and accurately transfer the multimedia data, such as moving image data or voice data in a format other than text format from the user terminal device. The display device can associate, through the data ID information, the multimedia data received through the data communication path identified by the communication path identification information with the position information, and can further display the multimedia data in the display position on the display portion indicated by the position information. Therefore, the display device can structure and display the multimedia data received through the dedicated data communication path in the display screen on the display portion.

The multiuser communication system configured as described above may be an electronic conference system. With this configuration, it is possible not only to reliably and easily manage, through the data ID information, remarks (display data) presented to an imaginary conference room (that is, the electronic conference system) but also to control the remarks (display data) presented to the imaginary conference room according to the access right (that is, whether to permit the presentation and the modification of the remarks (display data)) that is set for each of the participants (users) participating in the imaginary conference room. It is therefore possible to achieve smooth communication between a plurality of users based on their access rights.

In the multiuser communication system configured as described, the display device and the information terminal devices may communicate with each other in accordance with XMPP. With this configuration, it is possible not only to perform real-time messaging (information exchange) between the display device and the information terminal devices (the moderator terminal device and the user terminal devices) but also to easily and reliably associate, through the data ID information, the data on which the messaging is performed in accordance with XMPP with the display data displayed on the display portion of the display device.

In the multiuser communication system configured as described, in accordance with at least one protocol of XEP-0166 (Jingle), XEP-0167 (Jingle RTP Sessions) and XEP-0177 (Jingle Raw UDP Transport) among XMPP, a data communication path through which the display data is transmitted may be opened between the display device and the user terminal device, and the display data may be transmitted from the user terminal device to the display device through the data communication path. With this configuration, even when NAT or a firewall is arranged in the networks between the display device and the user terminal devices, since the display data is transmitted through a data communication path separate from the networks, it is possible to reliably transfer the display data through the data communication path without being affected such as by the interruption of the data transfer.

Advantages of the Invention

According to the present invention, the display data is transmitted to the display device through the data communication path separate from the network connecting the display device to the information processing devices. Hence, even when data exchanged through the network and the display data transmitted through the data communication path differ from each other in transmission characteristics, they do not interfere with each other, and thus it is possible to prevent the occurrence of transfer fluctuations and the like that cause variations in data transfer rate and data reception interval. It is therefore possible to easily, efficiently and accurately transfer the display data from the user terminal device to the display device. Moreover, through the data ID information, the display device can associate the display data received through the data communication path identified by the communication path identification information with the position information and can also display the display data in the display position on the display portion indicated by the position information. Therefore, the display device can structure and display the display data transmitted through the dedicated data communication path in the display screen on the display portion.

BRIEF DESCRIPTION OF DRAWINGS

[FIG. 8A] A diagram showing an example where html fragmentation information including text data is expressed as an html document;

[FIG. 8B] A diagram showing an example where html fragmentation information including moving image data is expressed as an html document;

[FIG. 8C] A diagram showing an example where html fragmentation information including voice data is expressed as an html document;

[FIG. 13] An operation diagram illustrating a procedure for displaying, in the display screen on the display device, multimedia data in a format other than text format supplied by the information terminal device according to the embodiment of the present invention.

BEST MODE FOR CARRYING OUT THE INVENTION

Figure 1:
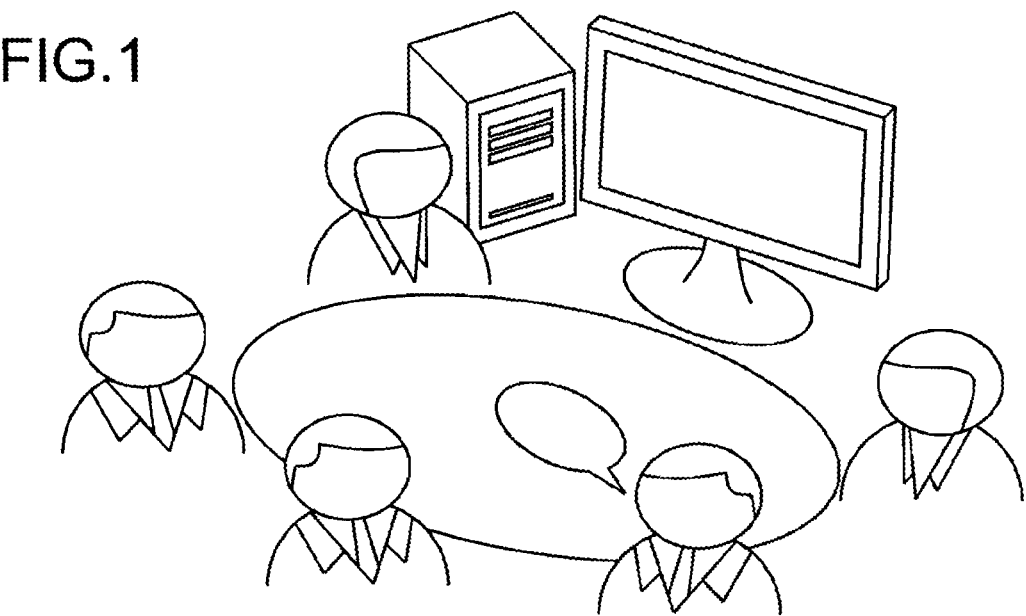
[FIG. 1] A conceptual diagram showing an example of a multiuser communication system of the present invention.

The present invention will be described below with reference to the accompanying drawings. FIG. 1 is a conceptual diagram showing an example of a multiuser communication system of the present invention. As shown in FIG. 1, in a place where a plurality of participants transmit information, the multiuser communication system of the present invention integrates, on a real time basis, various types of information presented by the participants, and structures and displays the integrated information on a display screen. Hence, for example, the multiuser communication system can be utilized as an electronic conference system or the like where a plurality of users participating in an imaginary conference room can present arguments and opinions. The multiuser communication system of the present invention will be described below using an example of an electronic conference system.

Figure 2:
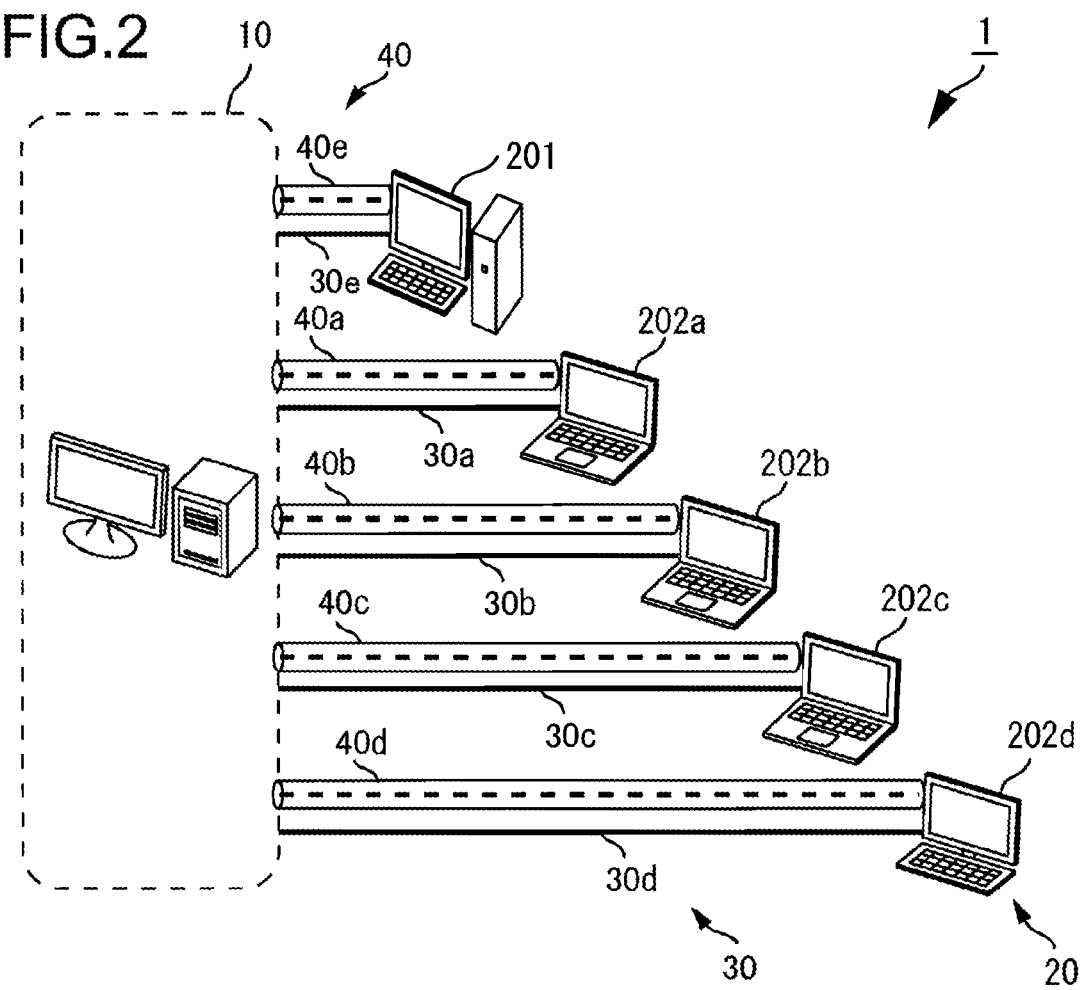
[FIG. 2] A diagram showing the configuration of an electronic conference system according to an embodiment of the present invention.

FIG. 2 is a diagram showing the configuration of an electronic conference system according to an embodiment of the present invention. As shown in FIG. 2, in the electronic conference system 1, a display device 10 and a plurality of information terminal devices 20 (201, 202a, 202b, 202c and 202d) communicate with each other through networks 30 (30a to 30e). The information terminal devices 20 include a moderator terminal device 201, which will be described later, and user terminal devices 202.

In the electronic conference system 1, a plurality of users participate in communication and display data transmitted, from the information terminal devices 20, which are used by the users, to the display device 10 through data lines 40 (data communication paths) other than the networks 30 is displayed on the display device 10. The display data (in particular, multimedia data in a format other than text format such as moving image data or voice data) presented by the users participating in the electronic conference system 1 to the electronic conference system 1 through the information terminal devices 20 is transmitted through the data lines 40 (40a to 40e) opened as necessary between the display device 10 and the information terminal devices 20 (the moderator terminal device 201 and the user terminal devices 202a to 202d) to the display device 10, where the display data is displayed in a structured state.

These data lines 40a to 40e are respectively logical communication paths that are opened in physical communication lines through which the networks 30a to 30e pass. Hence, when the data lines 40 through which the display data is directly transmitted are opened between the display device 10 and the information terminal devices 20, it is not necessary to provide any physical communication line other than the networks 30. Here, the logical communication path refers to an imaginary communication line (logical line) in logical terms that is included in a communication line in physical terms. For example, even when only one communication line is physically present, a plurality of logical lines can be set, and data communication that differs from one logical line to another can be performed. For example, the networks 30 and the data lines 40 pass through the same physical communication lines; however, they are different logical lines.

The electronic conference system 1 is constructed utilizing XMPP (extensible messaging and presence protocol), which will be described later; the display device 10 and the information terminal devices 20 communicate with each other in accordance with XMPP. Hence, in the communication between the display device 10 and the information terminal devices 20, real-time messaging (information exchange) can be achieved.

XMPP, which is utilized in the electronic conference system 1 of the present embodiment, will now be described. XMPP is an XML (extensible markup language)-based protocol, which is standardized by XSF (XMPP standards foundation), which is separated from the XMPP working group of IETF (internet engineering task force). XMPP dynamically controls a wide range of applications including an instant message, presence ("what is the state of the party on the other end at present"), a multi-user chat, a voice or television telephone, a coordination task, content syndication and generalized routing on XML data; in order to perform real-time communication in a communication system such as the Internet, XMPP is composed of a plurality of extension protocols (XEP: XMPP Extension Protocol) that are standardized according to the purposes thereof.

The electronic conference system 1 of the present embodiment utilizes various protocols specified by XMPP described above. XEP-0030 (Service Discovery), XEP-0045 (Multi-User Chat), XEP-0071 (Xhtml-IM) and XEP-0166 (Jingle), which are important protocols for understanding the electronic conference system 1 of the present embodiment, will now be described.

XEP-0030 (Service Discovery) is a protocol that specifies the function of detecting information. XEP-0030 (Service Discovery) is hereinafter referred to as "DISCO". In the electronic conference system 1 of the present embodiment, as described later, the information terminal device 20 utilizes DISCO to search an electronic conference system 1 to be joined.

XEP-0045 (Multi-User Chat) is a protocol that specifies a multiuser chat function with which a plurality of XMPP users can exchange messages within a specific community (chart room) in an imaginary space on a network. XEP-0045 (Multi-User Chat) is hereinafter referred to as "MUC". This protocol specifies a model for controlling a chat room such as by the following functions: standard chat functions such as topics of the chat room and invitation to the chat room; the function of kicking or banning a user; and the function of assigning a role and an affiliation described later to the users of the chart room.

The role refers to a temporary position or a privileged level that is given to the user who utilizes the chat. In MUC, a "moderator" who can kick the user and delete its remark, a "participant" who has a voice, a "visitor" who has no voice and the like are specified. The affiliation is given to the user as a permanently valid one even after the use of the chat. In MUC, an "owner" who has opened the chat room, an "administer" who administers and operates the chat room, a "member" who is a user other than those described above, an "outcast" who has been kicked and is not allowed to reenter the chat room and the like are specified.

The electronic conference system 1 of the present embodiment is operated by utilizing XMPP as described above, in particular, the multiuser chat function and the like in accordance with MUC (XEP-0045). This MUC function is provided by the display device 10 as described later.

XEP-0071 (Xhtml-IM) is a protocol that specifies the exchange of instant messages including a markup (tagging) of a lightweight text using a subset of html. With this protocol, it is possible to set the format of a message utilizing a narrow range of properties of an html element, an attribute and a style that are suitable for use of the instant messages and that are commonly used. The display device 10 and the information terminal devices 20 in the electronic conference system 1 of the present embodiment exchange XMPP messages such as text data in accordance with a protocol further extended from XEP-0071 (Xhtml-IM) described above.

XEP-0166 (Jingle) is a protocol that specifies the function of establishing a communication path through which to exchange data between two communication-capable terminal devices. Examples of protocols related to Jingle described above include XEP-0167 (Jingle RTP Sessions) and XEP-0177 (Jingle Raw UDP Transport Method). XEP-0167 is a protocol that specifies the function of establishing a communication path through which to exchange data such as voice data or moving image data in a streaming mode, using RTP (Real-time Transport Protocol). XEP-0177 (Jingle Raw UDP Transport Method) is a protocol that defines the exchange of data, utilizing UDP (User Datagram Protocol). XEP-0166 (Jingle) is hereinafter referred to as Jingle. XEP-0167 (Jingle RTP Sessions) is hereinafter referred to as Jingle-RTP; XEP-0177 (Jingle Raw UDP Transport Method) is hereinafter referred to as Jingle-UDP.

In the electronic conference system 1 of the present embodiment, when multimedia data such as moving image data or voice data is exchanged between the display device 10 and the information terminal device 20, as described later, the data line 40 (data communication path) for transferring the multimedia data is established between the display device and information terminal device in accordance with a protocol such as Jingle (XEP-0166), and Jingle-RTP (XEP-0167) and Jingle-UDP (XEP-0177), which are the associated protocol; the multimedia data is transferred through the data lines 40.

<Configuration of the Device>

Figure 3:
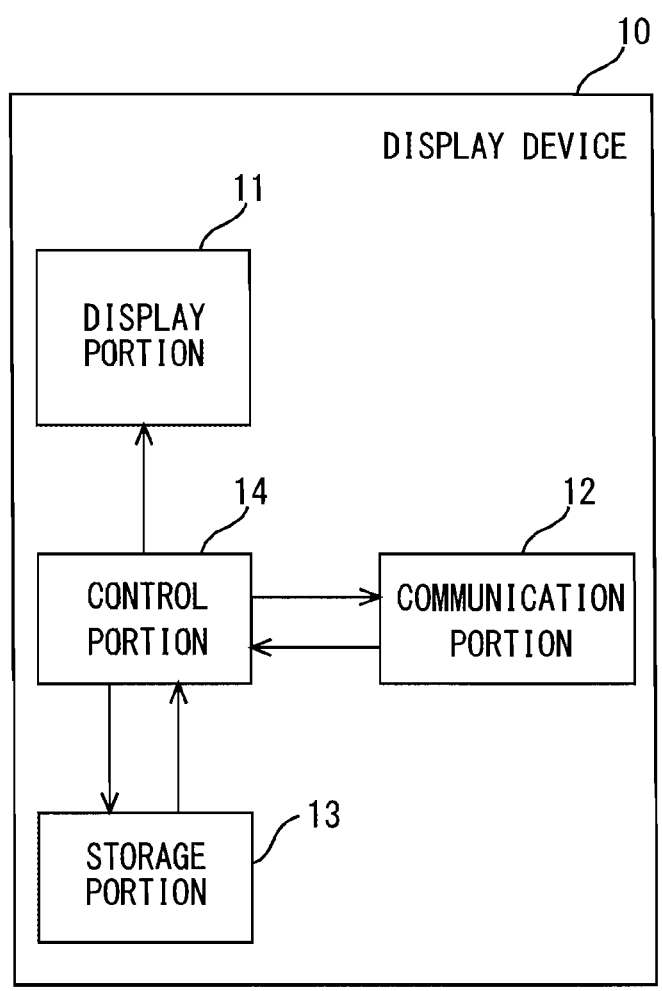
[FIG. 3] A diagram showing the configuration of a display device according to the embodiment of the present invention.

The specific configuration of the display device 10 included in the electronic conference system 1 of the present embodiment will now be described in detail with reference to the accompanying drawings. FIG. 3 is a diagram showing the configuration of the display device according to the embodiment of the present invention.

The display device 10 communicates with the information terminal devices 20 included in the electronic conference system 1 in accordance with XMPP. The display device 10 utilizes the drawing mechanism of html (hyper text markup language) as structured display information (display information) for displaying, in a structured state, information such as conference proceedings containing remarks (display data) that are presented by participants (information terminal devices 20) of the electronic conference system 1.

As shown in FIG. 3, the display device 10 includes: a display portion 11 that displays the display data; a communication portion 12 that performs communication with the information terminal devices 20 (the moderator terminal device 201 and the user terminal devices 202) through the networks 30; a storage portion 13 that stores the structured display information, information exchanged by the communication portion 12 and the like; and a control portion 14 that controls the display portion 11, the communication portion 12 and the storage portion 13.

The communication portion 12 receives, from the moderator terminal device 201 through the network 30, information (first information) including: a data ID (data ID information) for identifying the display data; position information indicating the position of the display data displayed on the display portion 11; user information indicating the user who is the owner of the display data; and access right information that is set for each of the users who use the information terminal devices 20 and that indicates whether to permit the generation and the change of the display data. When the data line 40 for transmitting the display data is opened between the display device 10 and the user terminal device 202, the communication portion 12 transmits, to the user terminal device 202 through the network 30, information (second information) including a stream ID (communication path identification information) for identifying the data line 40 and the data ID (data ID information).

When the communication portion 12 receives the information (first information) including the data ID (data ID information) and the position information from the moderator terminal device 201 through the network 30, the control portion 14 opens the data line 40 (data communication path), through which the display data is transmitted, between the display device 10 and the user terminal device 202. The information (first information) received from the moderator terminal device 201 includes the access right information and the user information. Hence, the control portion 14 opens the data line 40, through which the display data is transmitted, between the display device 10 and the user terminal device 202 that is used by the user indicated by either the access right information or the user information, which is received by the communication portion 12 from the moderator terminal device 201.

The control portion 14 integrates the display data received from the information terminal devices 20, and thereby performs the generation and the editing of the structured display information, the modification of information included in the structured display information (such as html fragmentation information and its meta information such as the data IDs, the position information, the access right information and the user information, which will be described later) and the preparation of documents described by html from the entire structure display information.

The display portion 11 structures and displays the display data that is presented from each of the information terminal devices 20 to the electronic conference system 1. Specifically, the display portion 11 performs a structured display based on the structured display information (display information) that is obtained by structuring a plurality of pieces of fragmentation information each having the display data and that is used for displaying remarks, materials and conference proceedings presented to the electronic conference system 1.

The display portion 11 displays the display data received by the communication portion 12, based on the stream ID, the data ID and the position information received from the moderator terminal device 201, through the data line 40 specified by the stream ID from the user terminal device 202. Specifically, the display portion 11 displays, in the display position of the display portion 11 indicated by the position information, the display data received by the communication portion 12 through the data line 40 specified by the stream ID from the user terminal device 202 and the display data that is related to the position information by the data ID and that is further specified by the data ID.

The display portion 11 displays the display data based on the following information received from the moderator terminal device 201: the stream ID; the data ID; the position information; the user information indicating the user who is the owner of the display data; and the access right information that is set for each of the users who use the information terminal devices and that indicates whether to permit the generation and the change of the display data. Specifically, when the user who receives the permission for the generation and the change of the display data indicated by the access right information agrees with the user indicated by the user information, the display portion 11 displays the display data based on the stream ID, the data ID and the position information.

Figure 4:
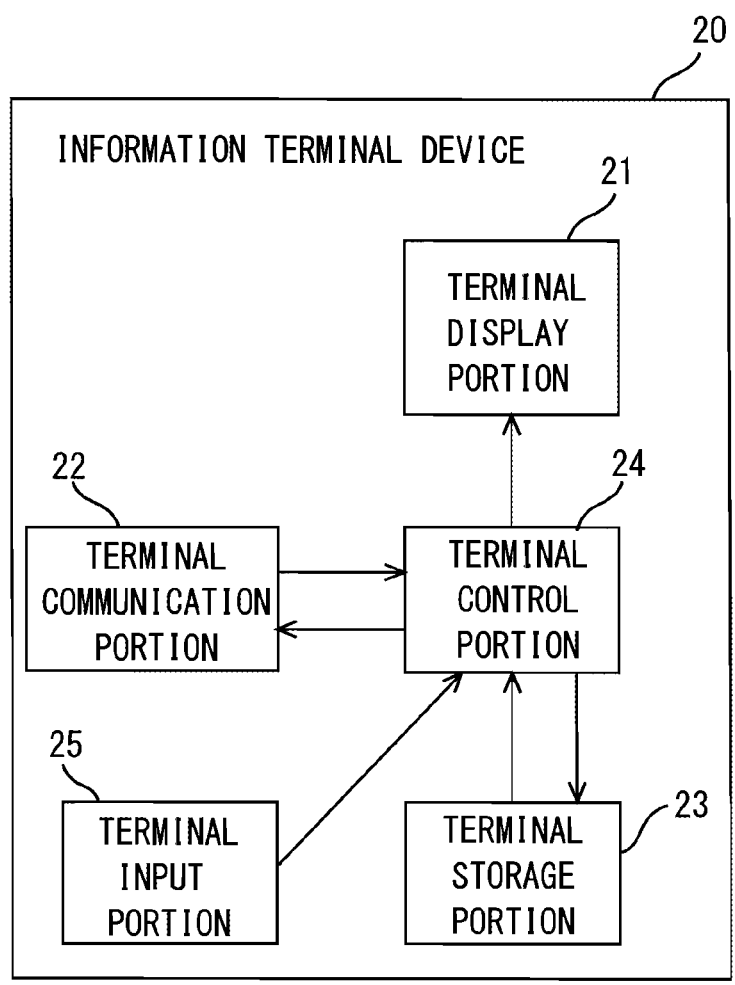
[FIG. 4] A diagram showing the configuration of an information terminal device according to the embodiment of the present invention.

The specific configuration of the information terminal device 20 included in the electronic conference system 1 of the present embodiment will now be described in detail with reference to the accompanying drawings. The information terminal device 20 communicates with the display device 10 included in the electronic conference system 1 in accordance with XMPP. FIG. 4 is a diagram showing the configuration of the information terminal device 20 according to the embodiment of the present invention.

As shown in FIG. 4, the information terminal device 20 includes: a terminal display portion 21 (display portion) that displays data and the like input by the user; a terminal communication portion 22 (communication portion) that exchanges information with the display device 10; a terminal storage portion 23 (storage portion) that stores information exchanged by the terminal communication portion 22, the display data to be displayed on the display portion 11 of the display device 10 and the like; a terminal control portion 24 (control portion) that controls an exchange operation by the terminal communication portion 22, the operation of storing and reading information by the terminal storage portion 23 and the like; and a terminal input portion 25 (input portion) with which the user inputs data. As described later, the terminal control portion 24 also performs, as necessary, the edition, the reconfiguration and the like of the html fragmentation information constituting the structured display information and its meta information.

The role, such as the moderator or the participant, which indicates a temporary privileged level in the electronic conference system 1 operated by utilizing the MUC function, is assigned to each of the information terminal devices 20. In the electronic conference system 1 of the present embodiment, an affiliation for each of the information terminal devices 20 will not be described; it is assumed that the moderator has affiliations for the owner and the administer and that the participant has an affiliation for the member. Affiliations for the visitor, the outcast and the like will not be described. In the following description, in an imaginary conference room (electronic conference system 1), the information terminal device receiving the role of the moderator is assumed to be the moderator terminal device 201, and the information terminal device receiving the role of the participant is assumed to be the user terminal device 202.

The moderator terminal device 201 is the information terminal device that performs conference proceedings in the electronic conference system 1 and manages the display data displayed on the display portion 11 of the display device 10. The terminal control portion 24 of the moderator terminal device 201 can set the data ID (data ID information) for identifying the display data displayed on the display portion 11 of the display device 10, the access right information indicating the access right indicating whether to permit the generation and the change of the display data for each of the users who use the information terminal devices 20 (in other words, the moderator terminal device 201 and the user terminal devices 202), the user information indicating the user who is the owner of the display data and the like. The terminal communication portion 22 transmits, to the display device 10 through the network 30, the information (first information) including the data ID, the position information, the user information and the access right information. As with the user terminal device 202, the moderator terminal device 201 can also transmit the display data to the display device 10.

The user terminal device 202 is the information terminal device 20 that transmits the display data to the display device 10. When the user terminal device 202 receives from the display device 10 information indicating the opening of the data line 40, the terminal control portion 24 negotiates with the display device 10 for the opening of the data line 40 and opens the data line 40, other than the network 30, for transmitting the display data, between the user terminal device 202 and the display device 10. When the user terminal device 202 receive, from the display device 10 through the network 30, the information (second information) including the data ID (data ID information) for identifying the display data and the stream ID (communication path identification information) for identifying the data line 40, the user terminal device 202 transmits the display data corresponding to the data ID from the terminal communication portion 22 through the data line 40 (data communication path) to the display device 10. The opening of the data line 40 and the transmission of the display data through the data line 40 described above are performed in accordance with at least one protocol of XEP-0166 (Jingle), XEP-0167 (Jingle RTP Sessions) and XEP-0177 (Jingle Raw UDP Transport) among XMPP.

Figure 5:
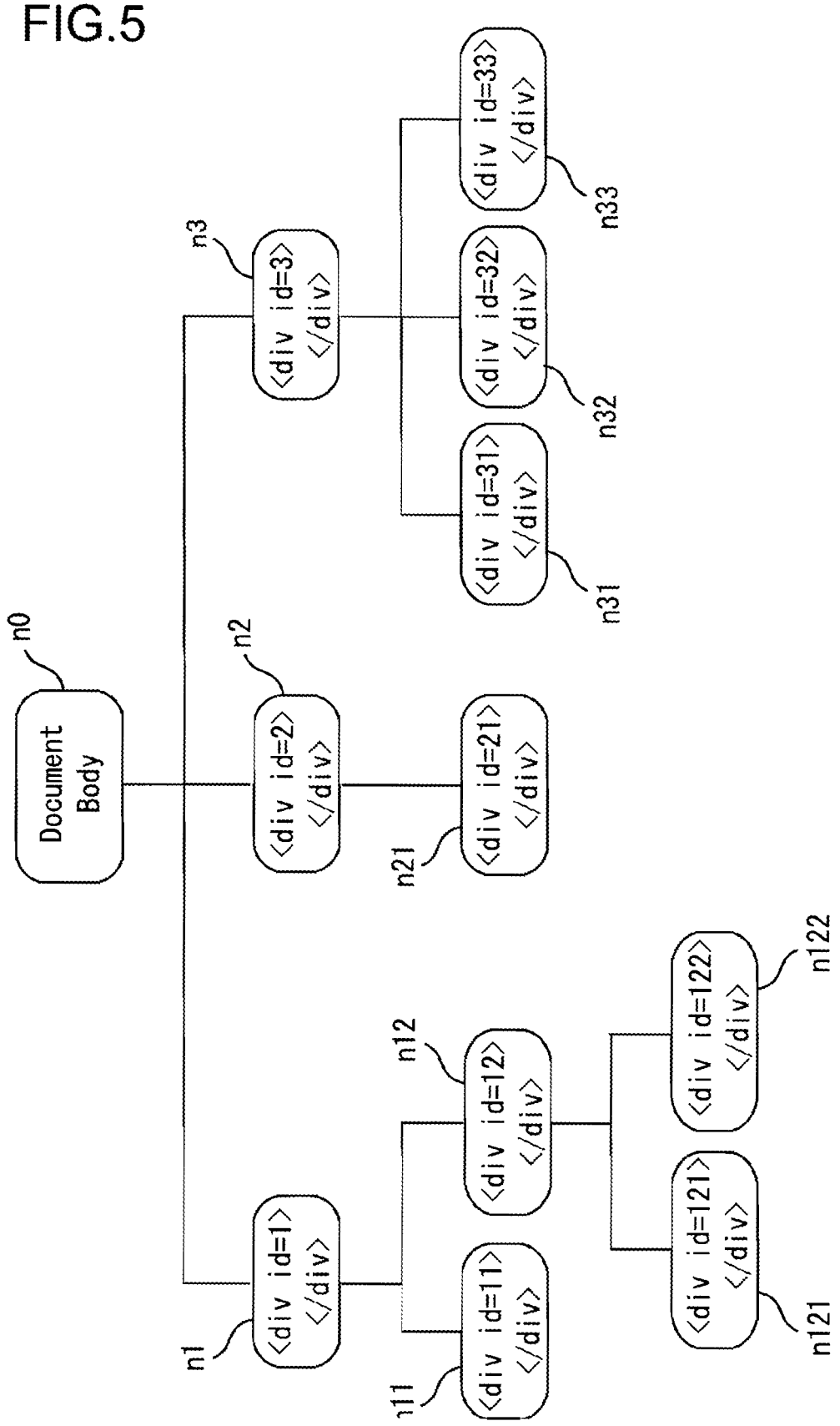
[FIG. 5] A diagram showing the configuration of structured display information according to the embodiment of the present invention.

The structured display information for displaying conference proceedings and the like in the electronic conference system 1 will now be described. In the structured display information, a plurality of pieces of information are structurally correlated; the structured display information is structured information for producing a display on the display portion 11 of the display device 10. Its structure is not particularly limited; a tree structure or the like can be employed. Individual pieces of information constituting the structured display information are hereinafter referred to as pieces of html fragmentation information. FIG. 5 is a diagram showing the configuration of the structured display information according to the embodiment of the present invention. As shown in FIG. 5, in the structured display information, individual pieces of html fragmentation information are hierarchically correlated with html fragmentation information n0 on the top of the hierarchy. Here, in this type of structure, a piece of html fragmentation information on the level that is one level higher than that of a certain piece of fragmentation information is referred to as parent html fragmentation information, and a piece of html fragmentation information on the level that is one level lower than that of a certain piece of fragmentation information is referred to as child html fragmentation information.

Figure 6:
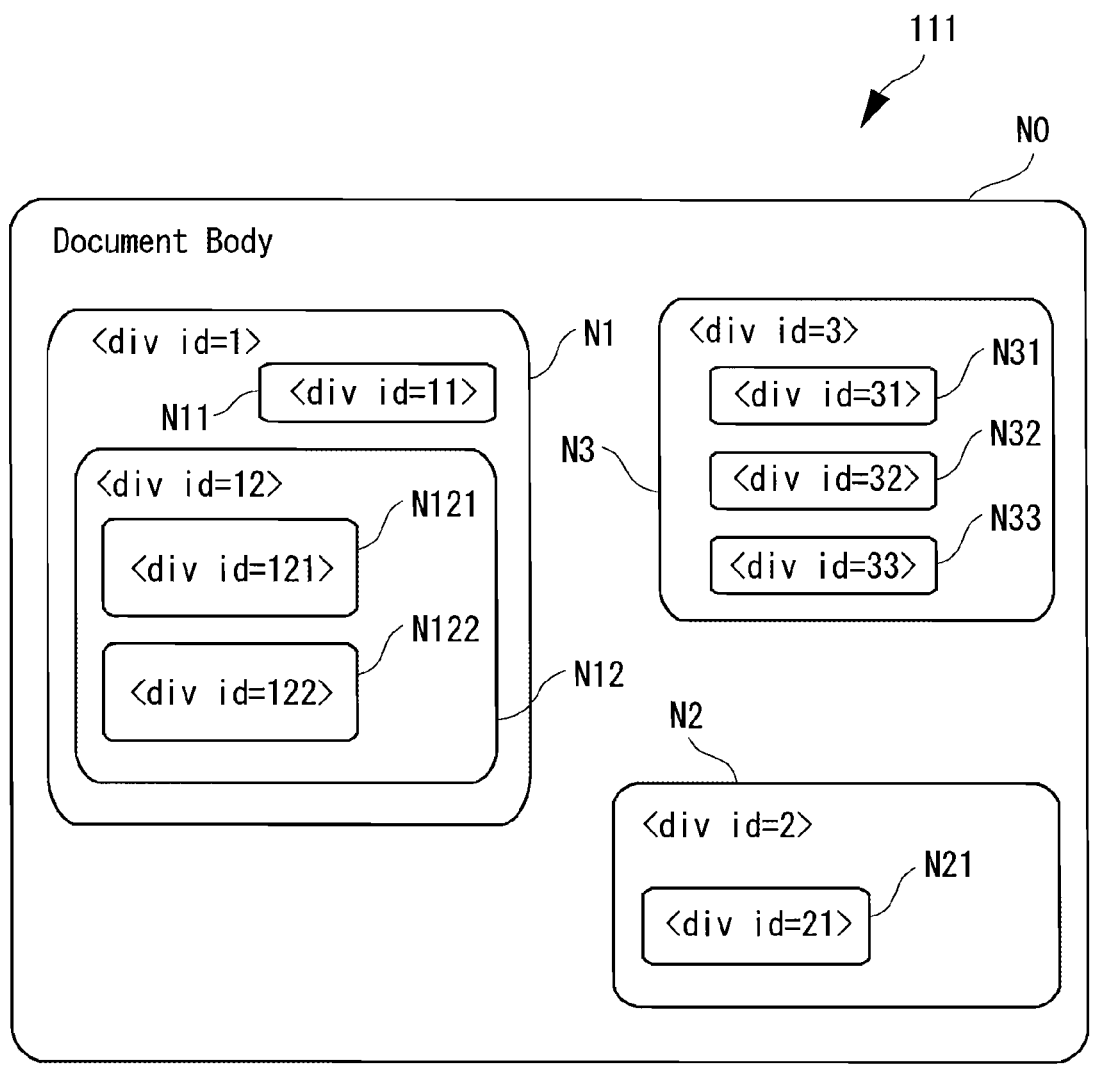
[FIG. 6] A diagram illustrating a display screen based on the structured display information according to the embodiment of the present invention.
Figure 7:
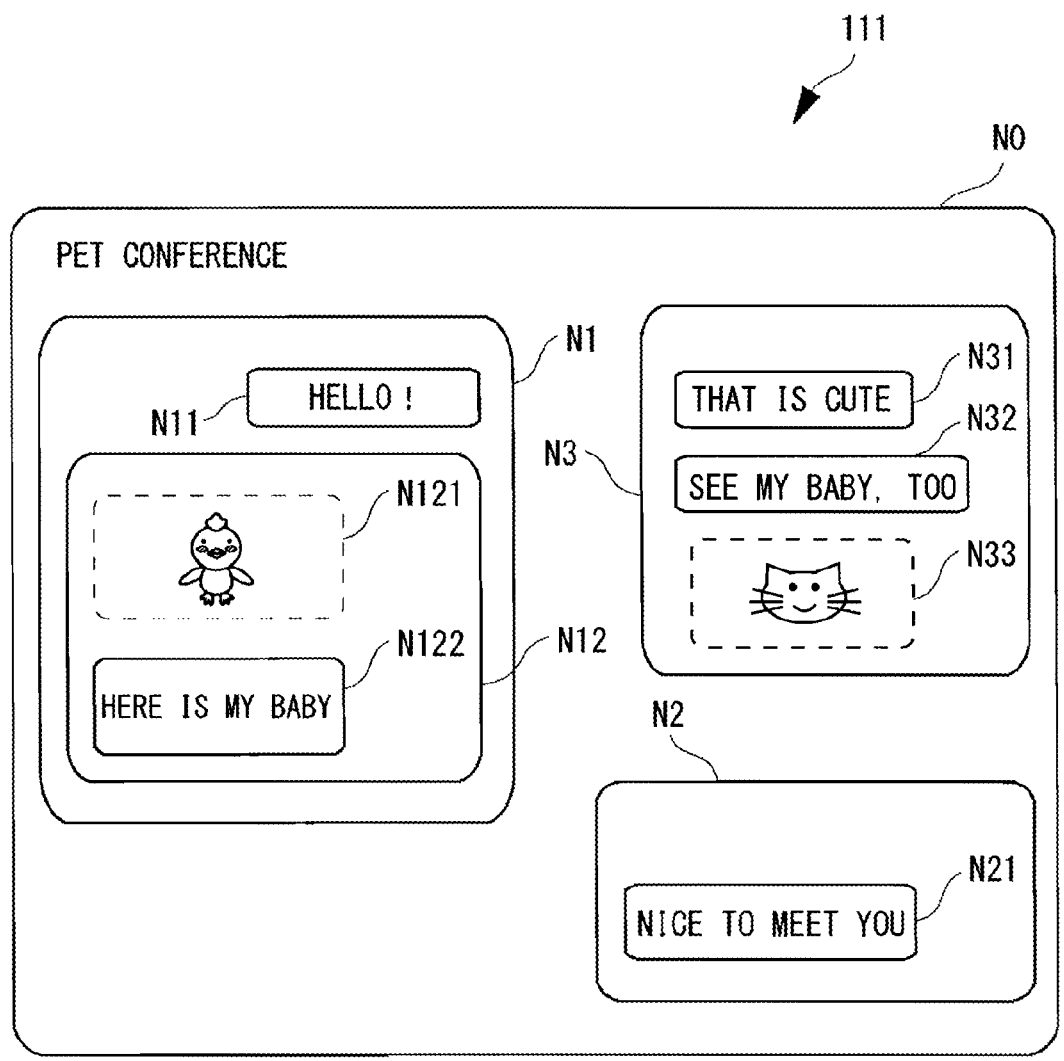
[FIG. 7] A diagram showing an example of an actual display screen based on the structured display information according to the embodiment of the present invention.

A display screen displayed on the display portion 11 of the display device 10 based on the structured display information composed of a plurality of pieces of html fragmentation information will now be described. FIG. 6 is a diagram illustrating the display screen based on the structured display information according to the embodiment of the present invention. FIG. 7 is a diagram showing an example of an actual display screen based on the structured display information according to the embodiment of the present invention. As shown in FIG. 7, information display frames in the display screen 111 of the display portion 11 correspond to the individual pieces of fragmentation information, respectively; individual pieces of display data (for example, text data, image data, moving image data and voice data) included in the individual pieces of fragmentation information are displayed within the corresponding information display frames.

For example, in the display screen 111, pieces of information included in the html fragmentation information n0 are displayed in an information display frame N0, and pieces of information included in html fragmentation information n1, n2 and n3 that is html fragmentation information (child html fragmentation information) on the level lower than that of the html fragmentation information n0 are displayed in information display frames N1, N2 and N3, respectively, arranged within the information display frame N0. Pieces of information included in html fragmentation information n11 and n12 that is child html fragmentation information of the html fragmentation information n1 are displayed in information display frames N11 and N12 arranged within the information display frame N1; a piece of information included in html fragmentation information n21 that is child html fragmentation information of the html fragmentation information n2 is displayed in an information display frame N21 arranged within the information display frame N2; and pieces of information included in html fragmentation information n31, n32 and n33 that is child html fragmentation information of the html fragmentation information n3 are displayed in information display frames N31, N32 and N33 arranged within the information display frame N3. Moreover, pieces of information included in html fragmentation information n121 and n122 that is child html fragmentation information of the html fragmentation information n12 are displayed in information display frames N121 and N22 arranged within the information display frame N12. As described above, in the display screen 111 of the display portion 11 based on the structured display information, information included in child html fragmentation information is displayed in an information display frame arranged within an information display frame of parent html fragmentation information.

The individual pieces of html fragmentation information constituting the structured display information respectively have the individual pieces of display data displayed on the display portion 11 of the display device 10. Examples of the individual pieces of display data included in the individual pieces of html fragmentation information include text data, image data, moving image data and voice data.

As meta information that is information related to the display data included in the html fragmentation information, each piece of html fragmentation information include: a unique data ID (data ID information) for identifying the display data (that is, the display data displayed on the display portion 11 of the display device 10) included in the html fragmentation information; position information indicating the display position of the display data (that is, the display data displayed on the display portion 11 of the display device 10) included in the html fragmentation information on the display portion 11; user information indicating the user who is the owner of the display data included in the html fragmentation information; and access right information indicating an access right (that is, whether to permit the generation, the change and the like of the display data included in the html fragmentation information) for the html fragmentation information that is set for each of the users who use the information terminal devices 20 (the moderator terminal device 201 and the user terminal devices 202). In the original html, there is no grammar with which to describe the access right information, the user information described above and the like. However, in the electronic conference system 1, since html is utilized in the multiuser communication system, the extension such as for describing the access right information and the user information is performed on the individual pieces of html fragmentation information.

The display position of the display data indicated by the position information may be specified by absolute coordinates within the information display frame of the parent html fragmentation information or may be arranged and displayed according to the flow of its document within the information display frame of the parent html fragmentation information. For example, when the html fragmentation information is described by being enclosed by <div>, the display position may be specified by absolute coordinates within the information display frame of the parent html fragmentation information; when the html fragmentation information is described by being enclosed by <par>, the display position may be arranged and displayed according to the flow of its document within the information display frame of the parent html fragmentation information.

The user information included in the meta information for each piece of html fragmentation information may indicate the owner of the piece of html fragmentation information; the user indicated by the user information may be such that the user can produce or delete the child html fragmentation information.

Each piece of html fragmentation information can be accessed by only the user who is permitted by the access right information that is set for each of the users using the information terminal devices and that indicates the access right (that is, whether to permit the generation, the change and the like of the display data) for the display data included in the piece of html fragmentation information. The user who has received the access right through the access right information can access the piece of html fragmentation information and perform the reference of the display data included in the piece of html fragmentation information and of the meta information, the change and modification of its content and the like. The access right for the parent html fragmentation information is passed to its child html fragmentation information. Specifically, the user who has not received the access right through the access right information for the parent html fragmentation information has no access right for the child html fragmentation information. The user who has received the access right through the access right information for the parent html fragmentation information also has the access right for the child html fragmentation information.

In FIGS. 8A to 8C, examples of the html fragmentation information of the present embodiment are shown. FIG. 8A is a diagram showing an example where the html fragmentation information including text data is expressed as an html document. FIG. 8B is a diagram showing an example where the html fragmentation information including moving image data is expressed as an html document. FIG. 8C is a diagram showing an example where the html fragmentation information including voice data is expressed as an html document.

In FIG. 8A, as meta information for the html fragmentation information, the following information is described: position information indicating the display position of the text data displayed on the display portion 11 of the display device 10; a unique data ID (data ID information) for identifying this text data; generation date and time information indicating the date and time when this text data is generated; update date and time information indicating the latest date and time when the content of this text data is changed; user information indicating the user who is the owner of this text data; and access right information that is set for each of the users using the information terminal devices 20 (the moderator terminal device 201 and the user terminal devices 202) and that indicates the access right (that is, whether to permit the generation, the change and the like of the text data included the html fragmentation information) for this html fragmentation information. Furthermore, text data that is displayed on the display portion 11 of the display device 10 is described.

Moreover, in FIG. 8B, as meta information for the html fragmentation information, the following information is described: position information indicating the display position of the moving image data displayed on the display portion 11 of the display device 10; a unique data ID (data ID information) for identifying this moving image data; user information indicating the user who is the owner of this moving image data; and access right information that is set for each of the users using the information terminal devices 20 (the moderator terminal device 201 and the user terminal devices 202) and that indicates the access right for this html fragmentation information. Furthermore, within the tag of <video/>, a unique stream ID (sid: communication path identification information) for identifying the data line 40 through which this moving image data is transmitted to the display device 10 is described.

Moreover, in FIG. 8C, as meta information for the html fragmentation information, the following information is described: position information indicating the display position of the voice data displayed on the display portion 11 of the display device 10; a unique data ID (data ID information) for identifying this voice data; user information indicating the user who is the owner of this voice data; and access right information that is set for each of the users using the information terminal devices 20 (the moderator terminal device 201 and the user terminal devices 202) and that indicates the access right for this html fragmentation information. Furthermore, within the tag of <audio/>, a unique stream ID (sid: communication path identification information) for identifying the data line 40 through which this voice data is transmitted to the display device 10 is described.

<Operation of the Electronic Conference System>

Figure 9:
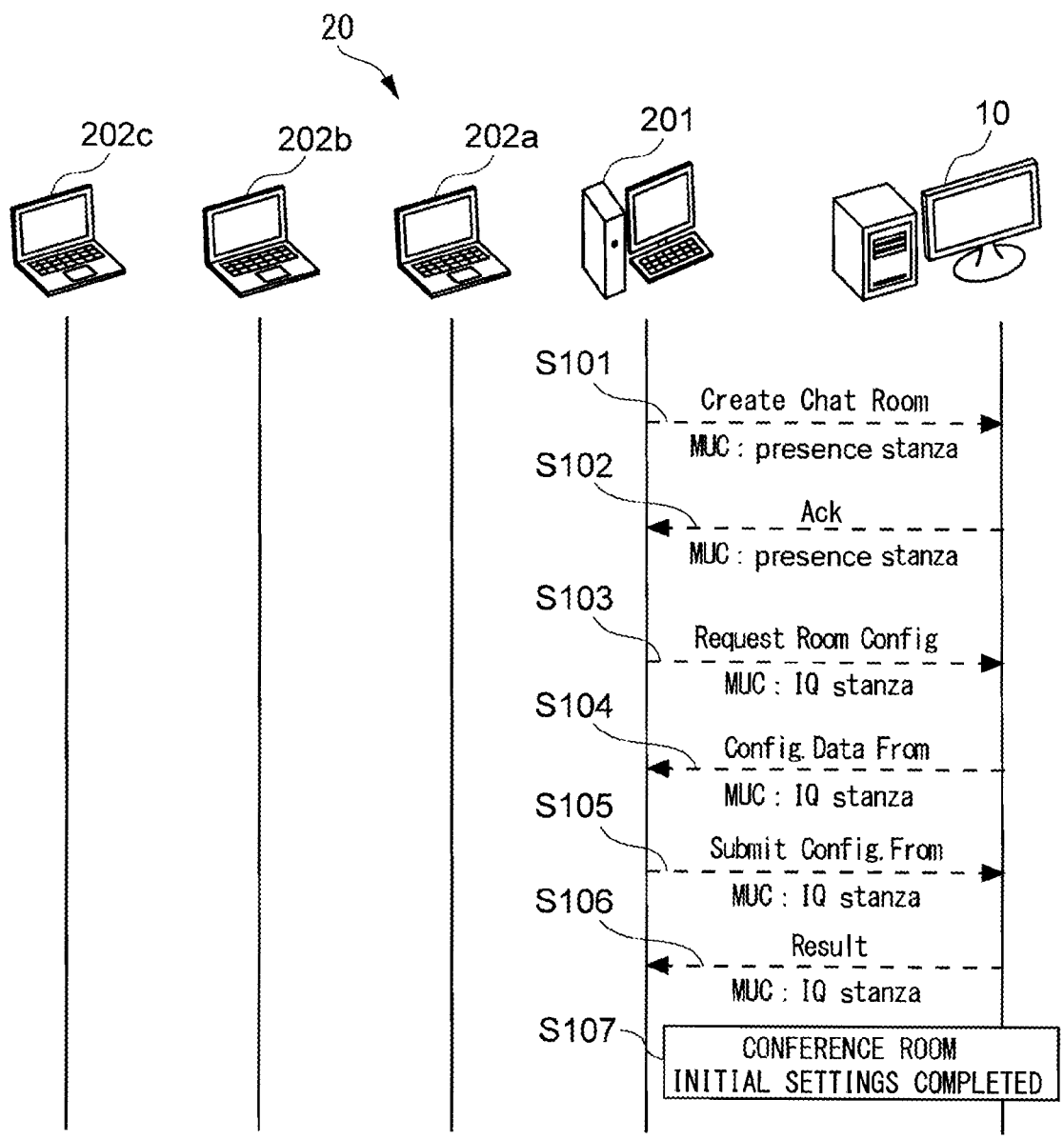
[FIG. 9] An operation diagram illustrating a procedure for opening the electronic conference system according to the embodiment of the present invention.

The specific operation of the electronic conference system 1 of the present embodiment will now be described. FIG. 9 is an operation diagram illustrating a procedure for opening the electronic conference system according to the embodiment of the present invention. Here, the display device 10 establishes the electronic conference system 1 utilizing a MUC function between the display device 10 and the moderator terminal device 201.

In step S101, the moderator terminal device 201 of the electronic conference system 1 transmits to the display device 10 information requiring the opening of an imaginary conference room (chat room).

In step S102, the display device 10 issues a notification indicating that the requirement is successfully received from the moderator terminal device 201.

In step S103, the moderator terminal device 201 notifies the display device 10 of information indicating that setting information for the opening of the imaginary conference room is produced.

In step S104, the display device 10 transmits data form information for producing the setting information to the moderator terminal device 201.

In step S105, the moderator terminal device 201 produces the setting information for opening the imaginary conference room based on the data form information received from the display device 10, and transmits the produced setting information to the display device 10.

In step S106, the display device 10 notifies the moderator terminal device 201 of information indicating that the setting information is successfully received.

In this way, the electronic conference system 1 is established between the display device 10 and the moderator terminal device 201, and thus the imaginary conference room in which a plurality of users using the information terminal devices 20 can participate is opened.

Figure 10:
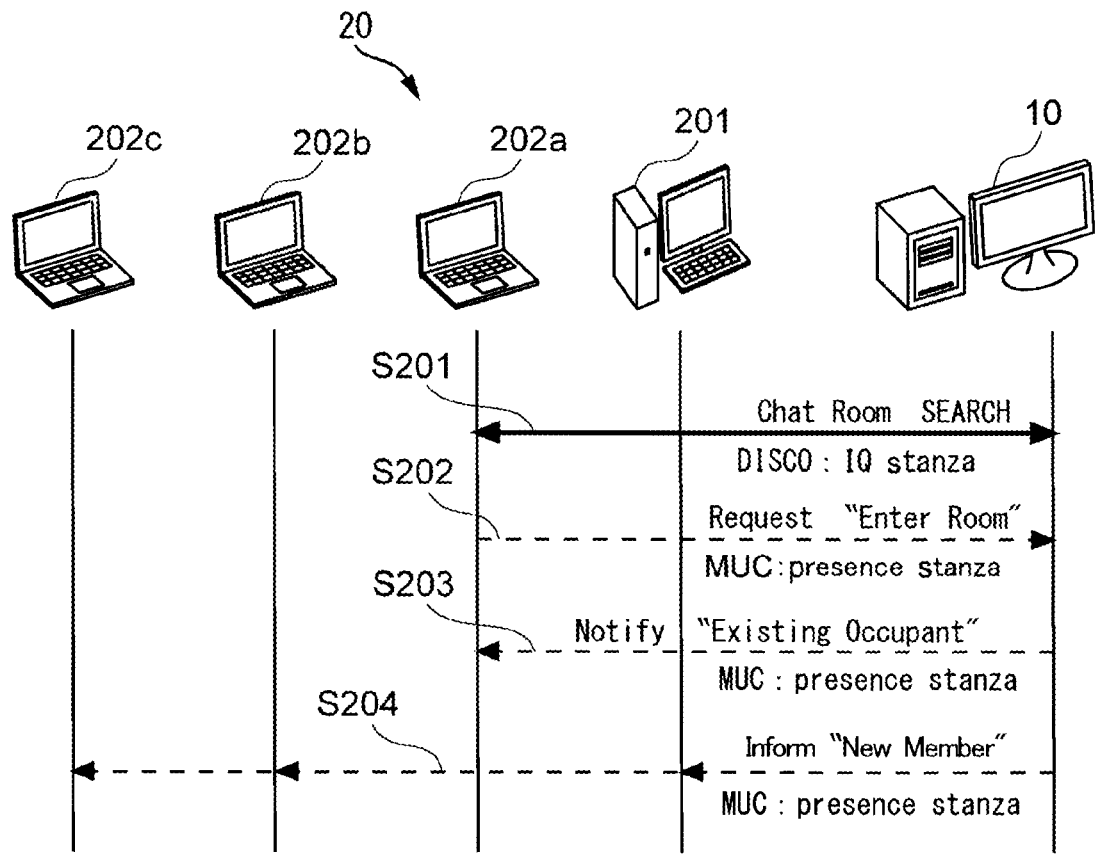
[FIG. 10] An operation diagram illustrating a procedure for making the information terminal device according to the embodiment of the present invention participate in the electronic conference system.

A procedure by which the user terminal device 202 participates in the imaginary conference room (electronic conference system 1) that has been opened will now be described. FIG. 10 is an operation diagram illustrating the procedure by which the information terminal device according to the embodiment of the present invention participates in the electronic conference system. Here, the procedure by which the user terminal device 202a, for example, participates in the imaginary conference room (that is, the electronic conference system 1) will be described.

In step S201, the user terminal device 202a utilizes XEP-0030 (Service Discovery), which is XMPP, and searches the imaginary conference room (electronic conference system 1) opened by the display device 10. Thus, the user terminal device 202a can find the imaginary conference room (electronic conference system 1) opened by the display device 10.

In step S202, the user terminal device 202a gives to the display device 10 a requirement for entering the imaginary conference room (electronic conference system 1).

In step S203, the display device 10 transmits, to the user terminal device 202a, a notification indicating that the user terminal device 202a is allowed to enter the room.

Then, in step S204, the display device 10 transmits, a notification indicating that there is a newcomer, to other information terminal devices (the moderator terminal device 201 and the user terminal devices 202) that have already entered the imaginary conference room (electronic conference system 1).

By performing the operations in steps S201 to S204, the user terminal device 202a can enter the imaginary conference room (electronic conference system 1) and communicate with the display device 10 and the other information terminal devices (the moderator terminal device 201 and the user terminal devices 202) in accordance with XMPP.

Figure 11:
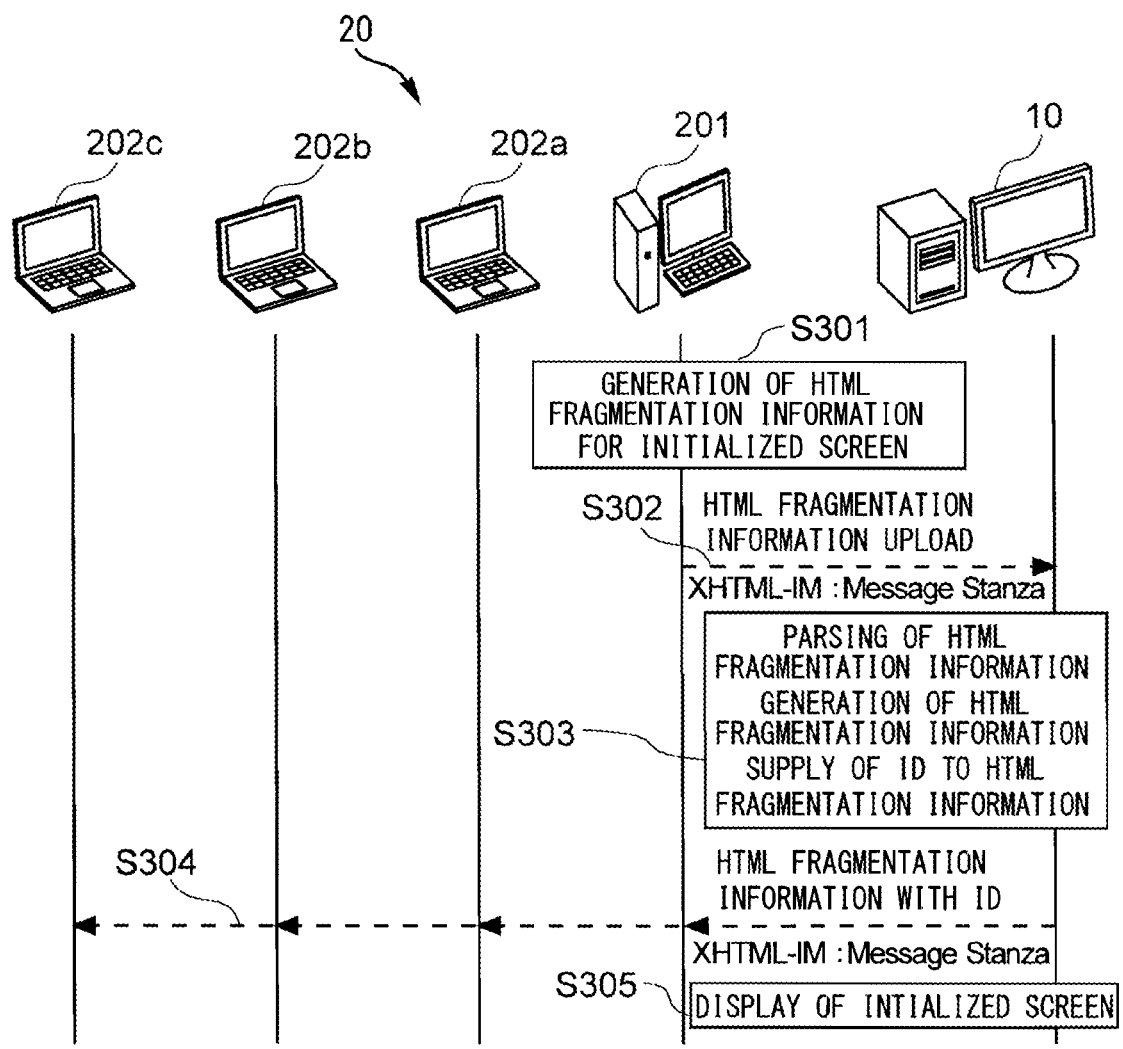
[FIG. 11] An operation diagram illustrating a procedure for performing initial settings for the structured display information on the electronic conference system according to the embodiment of the present invention.

A procedure by which the information terminal devices 20 participating in the electronic conference system 1 share the structured display information will now be described. FIG. 11 is an operation diagram illustrating a procedure by which initial settings are performed for the structured display information of the electronic conference system according to the embodiment of the present invention.

In step S301, the moderator terminal device 201 that has established the imaginary conference room (electronic conference system 1) with the display device 10 in steps S101 to S107 described above produces the structured display information for displaying conference proceedings for the electronic conference system 1 or the like on the display portion 11 of the display device 10. As described previously, in the structured display information thus produced, pieces of html fragmentation information are structurally correlated (for example, a tree structure).

The moderator terminal device 201 supplies a unique data ID (that is, a data ID for identifying the display data included in the html fragmentation information) to each piece of the html fragmentation information. Moreover, the moderator terminal device 201 produces, as meta information for each piece of the html fragmentation information, the attribute information as described previously, that is, the position information indicating the display position of the display data included in the html fragmentation on the display screen 111, the user information indicating the user who is the owner of the html fragmentation information, the access right information that is set for each of the users using the information terminal devices 20 (the moderator terminal device 201 and the user terminal devices 202) and that indicates the access right (that is, whether to permit the generation, the change and the like of the information included in the html fragmentation information) for the html fragmentation information and the like.

In step S302, the moderator terminal device 201 transmits the produced pieces of html fragmentation information to the display device 10.

In step S303, the display device 10 performs parsing on the received pieces of html fragmentation information, and produces pieces of html fragmentation information corresponding to the received pieces of html fragmentation information. The display device 10 checks whether or not the data IDs for identifying the produced pieces of html fragmentation information do not agree with the data IDs for the other html fragmentation information. Then, the display device 10 produces the structured display information composed of the pieces of html fragmentation information.

In step S304, the display device 10 further transmits the structured display information obtained by structuring the produced pieces of html fragmentation information to the information terminal devices (the moderator terminal device 201 and the user terminal devices 202).

In step S305, the display device 10 displays an initialized screen on the display portion 11 based on the structured display information on which the initial settings have been performed.

In this way, the initial setting processing on the structured display information is completed, and the initialized screen is displayed on the display portion 11 of the display device 10 based on the structured display information.

Figure 12:
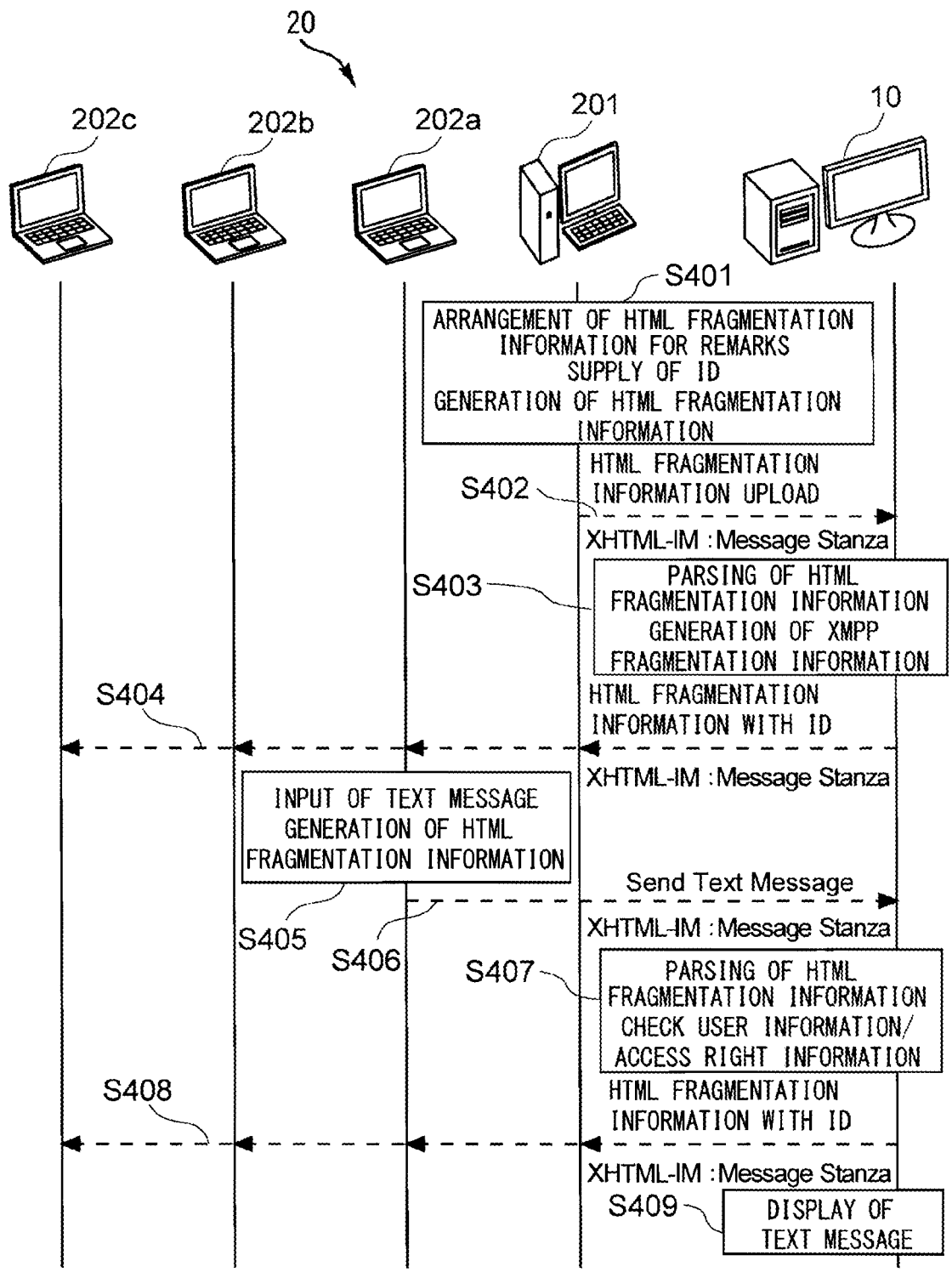
[FIG. 12] An operation diagram illustrating a procedure for displaying, in the display screen on the display device, text data supplied by the information terminal device according to the embodiment of the present invention.

A procedure by which the text data presented to the imaginary conference room (electronic conference system 1) is displayed on the display device 10 will now be described. Here, as an example, a procedure by which information (such as a remark) presented by the user terminal device 202a to the imaginary conference room is displayed on the display device 10 will be described. FIG. 12 is an operation diagram illustrating the procedure by which the text data presented by the information terminal device according to the embodiment of the present invention is displayed on the display screen of the display device. It is assumed that, for example, the user at the user terminal device 202a is in a state in which a remark should be presented or is directly allowed by the user at the moderator terminal device 201 through off line or the like to make a remark.

In step S401, the moderator terminal device 201 produces html fragmentation information for the remark (hereinafter, remark html fragmentation information) necessary for the user terminal device 202a to make a remark in the imaginary conference room (electronic conference system 1). Here, the remark html fragmentation information produced by the moderator terminal device 201 is incorporated into the structured display information, and thus an information display frame for displaying the remark (text data) presented by a remarker (in this case, the user terminal device 202a) is set in the display screen 111 on the display portion 11 of the display device 10.

The moderator terminal device 201 produces, at the terminal control portion 24, a unique data ID for identifying the text data included in the remark html fragmentation information such that the unique data ID does not agree with the data IDs for the text data included in the other html fragmentation information, and produces position information indicating the display position of the remark (data) presented by the remarker (user terminal device 202a) displayed on the display portion 11 of the display device 10. Furthermore, the moderator terminal device 201 produces; user information indicating the user who is the owner of the data stored in the remark html fragmentation information; access right information that is set for each of the users who use the information terminal devices 20 (the moderator terminal device 201 and the user terminal devices 202) and that indicates an access right (that is, whether to permit the generation, the change and the like of the data stored in the remark html fragmentation information) for the remark html fragmentation information; and the like. The moderator terminal device 201 supplies them to the remark html fragmentation information as meta information.

For example, this remark html fragmentation information is described as shown in FIG. 8A. At this point, the text data is not stored in the remark html fragmentation information.

In step S402, the moderator terminal device 201 transmits the remark html fragmentation information to the display device 10 through the network 30e. Here, the meta information such as the data ID, the user information, the access right information and the position information indicating the display position of the text data displayed on the display portion 11 of the display device 10 is also transmitted to the display device 10 through the network 30e.

This remark html fragmentation information is an html file obtained by extending the meta information. Here, the html file obtained by extending the meta information refers to data in a format that can be expressed by html compatible to the communication in accordance with XMPP, and the data includes meta information that is information (attribute information) related to the text data transferred from the user terminal device 202a to the display device 10. As the meta information, the attribute information, such as the data ID, the position information, the access right information and the user information, that corresponds to the messaging in accordance with XMPP is included.

In step S403, the display device 10 performs parsing on the remark html fragmentation information, and, if the syntax is correct, an information display frame is provided to allow the remarker (in this case, the user terminal device 202a) to make a remark.

In step S404, the display device 10 further transmits the remark html fragmentation information including the data ID produced in step S401 to the information terminal devices 20 (the moderator terminal device 201 and the user terminal devices 202 including the user terminal device 202a) through the network 30, and provides, to the display screen 111 of the display portion 11, a notification indicating that the information display frame (here, the information display frame for the user terminal device 202a) allowing the remarker to make a remark is supplied.

In step S405, the remark (text data) presented by the user terminal device 202a to the imaginary conference room (electronic conference system 1) is input to the terminal input portion 25. Here, the text data input from the terminal input portion 25 is the data that is stored in the remark html fragmentation information specified by the data ID. Then, the user terminal device 202a edits the remark html fragmentation information so as to add the text data input from the terminal input portion 25 to the remark html fragmentation information.

In step S406, the user terminal device 202a transmits the remark html fragmentation information including the text data to the display device 10 through the network 30a. Here, the user terminal device 202a also transmits, as meta information for this remark html fragmentation information, the data ID, the user information, the access right information and the like for this remark html fragmentation information, to the display device 10 through the network 30a.

In step S407, the display device 10 performs parsing on the remark html fragmentation information received from the user terminal device 202a, and edits the structured display information based on the received remark html fragmentation information. Specifically, the display device 10 determines whether or not the user who receives the access right for the remark html fragmentation information indicated by the access right information agrees with the user indicated by the user information. If they agree with each other, since the user using the user terminal device 202a is allowed to use the access right (that is, the generation and the change of data included in the remark html fragmentation information) for the remark html fragmentation information, the control portion 14 of the display device 10 edits the structured display information based on the received remark html fragmentation information.

Then, in step S408, the display device 10 transmits the remark html fragmentation information including the data ID (data ID information) edited in step S407 to the information terminal devices 20 (the moderator terminal device 201 and the user terminal devices 202 including the user terminal device 202a) through the network 30, and provides a notification indicating that this remark html fragmentation information is edited.

Then, in step S409, the display device 10 displays on the display portion 11 the conference proceedings and the like for the imaginary conference room (electronic conference system 1) based on the structured display information that has been edited. Here, the display device 10 displays on the display portion 11 the text data identified by the data ID based on the user information, the access right information and the position information. Specifically, the display device 10 displays the text data stored in the html fragmentation information identified by the data ID in the display position on the display screen 111 indicated by the position information. In this way, the user using the moderator terminal device 201 can reliably and easily manage the display position of the text data displayed on the display portion 11 of the display device 10.

A description will now be given of the case where a participant who participates in the imaginary conference room (electronic conference system 1) presents multimedia data, such as moving image data or voice data, in a format other than text format. Here, a procedure by which reference materials (multimedia data) presented by the user terminal device 202a to the imaginary conference room is displayed on the display device 10 will be described by way of example. FIG. 13 is an operation diagram illustrating the procedure by which the multimedia data, in a format other than the text format, that is presented by the information terminal device according to the embodiment of the present invention is displayed on the display screen of the display device. It is assumed that, for example, the user at the user terminal device 202a is in a state in which a remark should be presented or is directly allowed by the user at the moderator terminal device 201 through off line or the like to present a remark.

In step S501, the moderator terminal device 201 produces the remark html fragmentation information necessary for the user terminal device 202a to make a remark (to present data) in the imaginary conference room (electronic conference system 1). Here, the remark html fragmentation information produced by the moderator terminal device 201 is incorporated into the structured display information, and thus the information display frame for displaying the materials (multimedia data) presented by the remarker (in this case, the user terminal device 202a) is set in the display screen 111 on the display portion 11 of the display device 10.

The moderator terminal device 201 produces, at the terminal control portion 24, a unique data ID for identifying the multimedia data included in the remark html fragmentation information such that the unique data ID does not agree with the data IDs for the multimedia data included in the other html fragmentation information, and produces position information indicating the display position of the materials (multimedia) presented by the remarker (user terminal device 202a) displayed on the display portion 11 of the display device 10. Furthermore, the moderator terminal device 201 produces; user information indicating the user who is the owner of the data stored in the remark html fragmentation information; access right information that is set for each of the users who use the information terminal devices 20 (the moderator terminal device 201 and the user terminal devices 202) and that indicates an access right (that is, whether to permit the generation, the change and the like of the multimedia data stored in the remark html fragmentation information) for the remark html fragmentation information; and the like. The moderator terminal device 201 supplies them to the remark html fragmentation information as meta information.

In this remark html fragmentation information, as shown in FIGS. 8B and 8C, not only the data ID, the position information, the user information, the access right information and the like but also the stream ID (sid: communication path identification information) for identifying the data line 40a through which the multimedia data presented by the user terminal device 202a to the electronic conference system 1 is transmitted is described. For example, when moving image data is presented, the <video/> tag is described as shown in FIG. 8B; when voice data is presented, the <audio/> tag is described as shown in FIG. 8C. The tag for describing this stream ID is extended according to the type of multimedia data transmitted through the data line 40a. At this point, since the data line 40a is not opened between the user terminal device 202a and the display device 10, the stream ID is not described in the tag (for example, the <video/> tag as shown in FIG. 8B and the <audio/> tag as shown in FIG. 8C) for describing the stream ID.

In step S502, the moderator terminal device 201 transmits, to the display device 10 through the network 30e, the remark html fragmentation information (first information) including the meta information such as the data ID, the user information, the access right information and the position information indicating the display position of the multimedia data displayed on the display portion 11 of the display device 10.

This remark html fragmentation information (first information) may be an html file obtained by extending the meta information. Here, the html file obtained by extending the meta information refers to data in a format that can be expressed by html compatible to the communication in accordance with XMPP, and the data includes meta information that is information (attribute information) related to the display data transferred through the data line 40a opened between the display device 10 and the user terminal device 202a. As the meta information, the attribute information, such as the data ID, the position information, the access right information and the user information, that corresponds to the messaging in accordance with XMPP is included. Utilizing, as meta information, the attribute information (such as the data ID, the position information, the access right information and the user information) that corresponds to the messaging in accordance with XMPP is referred to as the extension.

As described above, this remark html fragmentation information (first information) is the html file obtained by extending the meta information, and thus it is possible to map the meta information (such as the data ID information, the position information, the user information and the access right information) included in the remark html fragmentation information onto description in html format utilized in a web browser. Specifically, it is possible to make the meta information (such as the data ID information, the position information, the user information and the access right information) included in the remark html fragmentation information correspond to the display elements of html. Thus, it is possible to connect the messaging in accordance with XMPP to web and html.

In step S503, the display device 10 performs parsing on the remark html fragmentation information, and, if the syntax is correct, an information display frame is provided to allow the materials (multimedia data) presented by the user terminal device 202a to be displayed.

In step S504, when the tag (for example, the <video/> tag as shown in FIG. 8B or the <audio/> tag as shown in FIG. 8C) for describing the stream ID is found at the time of the parsing on the remark html fragmentation information, the display device 10 determines that, based on the meta information for the remark html fragmentation information, the multimedia data such as moving image data or voice data is transmitted from the user terminal device 202a, and starts the settings for opening the data line 40a (data communication path), separate from the network 30a, between the display device 10 and the user terminal device 202a, through which the multimedia data is transferred.

The setting and the opening of the data line 40*a* are performed in accordance with an applied protocol of XMPP such as XEP-0166 (Jingle), XEP-0167 (Jingle RTP Sessions) and XEP-0177 (Jingle Raw UDP Transport). Here, the display device 10 is the side that suggests the setting of the data line 40*a*, that is, an initiator for Jingle; the user terminal device 202*a* is the side that agrees or rejects the suggestion for the setting of the data line 40*a*, that is, a responder for Jingle.

In step S505, the display device 10 transmits, to the user terminal device 202*a* through the network 30*a*, information indicating that the opening of the data line 40*a* for transferring the multimedia data is suggested.

In step S506, the user terminal device 202*a* transmits, to the display device 10 through the network 30*a*, information indicating that the suggestion is confirmed.

In step S507, a negotiation for settings for opening the data line 40*a* between the display device 10 and the user terminal device 202*a* is conducted in accordance with the applied protocol of XMPP such as XEP-0166 (Jingle), XEP-0167 (Jingle RTP Sessions) and XEP-0177 (Jingle Raw UDP Transport). In this negotiation, the data line 40 can also be set as an encrypted line. According to the result of this negotiation, the user terminal device 202*a* determines whether to agree with or reject the suggestion for opening the data line 40*a*. In the present embodiment, the user terminal device 202*a* is assumed to determine, as a result of the negotiation, that it agrees with the suggestion.

In step S508, the user terminal device 202*a* transmits, to the display device 10 through the network 30*a*, information indicating that it agrees with the suggestion for setting the data line 40*a*.

In step S509, the display device 10 transmits, to the user terminal device 202*a* through the network 30*a*, information indicating that the agreement on the suggestion is confirmed. Then, as shown in FIG. 2, the data line 40*a*, through which data can be directly transferred, is opened between the display device 10 and the user terminal device 202*a*.

This data line 40*a* is a logical communication path that is opened in a physical communication line through which the network 30*a* passes. Hence, when the data line 40*a* through which the display data is directly transmitted is opened between the display device 10 and the user terminal device 202*a*, it is not necessary to provide any physical communication line other than the network 30*a*. Here, the logical communication path refers to an imaginary communication line (logical line) in logical terms that is included in a communication line in physical terms. For example, even when only one communication line is physically present, a plurality of logical lines can be set, and data communication that differs from one logical line to another can be performed. For example, the network 30*a* and the data line 40*a* pass through the same physical communication lines; however, they are different logical lines.

In step S510, the display device 10 produces a stream ID (sid: communication path identification information) for identifying the data line 40*a* opened between the display device 10 and the user terminal device 202*a* such that the stream ID does not agree with the stream IDs for the other communication lines. Then, the display device 10 transmits, to the information terminal devices 20 (the moderator terminal device 201 and the user terminal devices 202) through the networks 30, the remark html fragmentation information (second information) including the data ID and the stream ID as the meta information, and provides a notification indicating that the information display frame (here, the information display frame for the user terminal device 202*a*) for displaying the materials (multimedia data) presented by the remarker in the display screen 111 on the display portion 11 is supplied.

This remark html fragmentation information (second information) may be an html file obtained by extending the meta information. Here, the html file obtained by extending the meta information refers to data in a format that can be expressed by html compatible to the communication in accordance with XMPP, and the data includes meta information that is information (attribute information) related to the display data transferred through the data communication path opened between the display device 10 and the user terminal device 202*a*. As the meta information, the attribute information, such as the data ID (data ID information) and the stream ID (communication path identification information), that corresponds to the messaging in accordance with XMPP is included.

As described above, this remark html fragmentation information (second information) is the html file obtained by extending the meta information, and thus it is possible to map the meta information (such as the data ID and the stream ID) included in the remark html fragmentation information onto description in html format utilized in a web browser. Specifically, it is possible to make the meta information (such as the data ID and the stream ID) included in the remark html fragmentation information correspond to the display elements of html. Thus, it is possible to connect the messaging in accordance with XMPP to web and html.

In step S511, the user terminal device 202*a* make preparations for transmitting the multimedia data presented to the imaginary conference room (electronic conference system 1) to the display device 10 through the data line 40*a* specified by the stream ID.

In step S512, the user terminal device 202*a* transfers the multimedia data to the display device 10 through the data line 40*a* specified by the stream ID in a streaming mode in accordance with a protocol such as Jingle (XEP-0166), which is the applied protocol of XMPP or the associated applied protocol of XMPP such as Jingle-RTP (XEP-0167) or Jingle-UDP (XEP-0177).

Then, in step S513, the control portion 14 of the display device 10 uses the data ID to associate the multimedia data transferred in the streaming mode through the data line 40*a* identified by the stream ID with the meta information such as the position information, the user information and the access right information. Here, the control portion 14 of the display device 10 determines whether or not the user who receives the access right indicated by the access right information agrees with the user indicated by the user information. If they agree with each other, the user using the user terminal device 202*a* is allowed to use the access right (that is, the generation and the change of the multimedia data included in the remark html fragmentation information) for the remark html fragmentation information in which the multimedia data is stored. Hence, the control portion 14 of the display device 10 stores the multimedia data, which is stream-transferred through the data line 40, in the remark html fragmentation information, edits the structured display information and displays, based on the data ID and the position information, the multimedia data in the display position in the display screen 111 on the display portion 11 indicated by the position information. Therefore, the user using the moderator terminal device 201 can reliably and easily manage the display position of the multimedia data displayed on the display portion 11 of the display device 10. Since the multimedia data such as moving image data or voice data is transferred in the streaming mode, it is also possible to sequentially reproduce the transferred multimedia data in the display position in the display screen 111 on the display portion 11 indicated by the position information.

The operations in steps S512 and S513 described above are repeated until the transfer of the multimedia data is completed.

After the transfer of the multimedia data is completed in step S514, the processing for closing the data line 40a between the display device 10 and the user terminal device 202a is performed. The display device 10 completes the role of the Jingle initiator; the user terminal device 202a completes the role of the Jingle responder.

In the embodiment described above, the display data is transferred through the data line 40a opened between the user terminal device 202a and the display device 10; in the other information terminal devices (such as the moderator terminal device 201 and the user terminal devices 202b to 202d), the display data can be transferred by opening the direct data line 40 in the same manner as described above.

As described above, in the embodiment described above, the moderator terminal device 201 transmits, to the display device 10 through the network 30, the remark html fragmentation information (first information) including the data ID (data ID information) for identifying the display data and the position information indicating the display position of the display data on the display portion 11 of the display device 10. Then, the data line 40 (data communication path) through which the display data is transmitted is opened between the display device 10 and the user terminal device 202 in addition to the network 30. The display device 10 transmits, to the user terminal device 202 through the network 30, the remark html fragmentation information (second information) including the stream ID (communication path identification information) for identifying the data line 40 and the data ID. The user terminal device 202 transmits the display data to the display device 10 through the data line 40 identified by the stream ID. Then, the display device 10 displays the display data on the display portion 11 based on the stream ID, the data ID and the position information.

As described above, through the dedicated data line 40 separate from the network 30, the display data is transmitted from the user terminal device 202 to the display device 10. Hence, even when data exchanged through the network 30 and the display data transmitted through the data line 40 differ from each other in transmission characteristics, they do not interfere with each other, and thus it is possible to prevent the occurrence of transfer fluctuations and the like that cause variations in data transfer rate and data reception interval. It is therefore possible to easily, efficiently and accurately transfer the display data from the user terminal device 202 to the display device 10. Even when multimedia data, such as moving image data or voice data, in a format other than text format is stream-transferred through the data communication path, the streaming transfer of the multimedia data does not continue to occupy the communication line, and it is also possible to efficiently and accurately exchange data through a network and to stream-transfer the multimedia data through the data communication path. Moreover, through the data ID, the display device 10 can associate the display data received through the data line 40 identified by the stream ID with the position information and can also display the display data in the display position on the display portion 11 indicated by the position information. Therefore, the display device 10 can structure and display the display data transmitted through the dedicated data line 40 in the display screen 111 on the display portion 11 of the display device 10.

The user using the moderator terminal device 201 can reliably and easily manage, through the data ID and the position information, the display data transmitted from the user terminal device 202 to the display device 10 through the dedicated data line 40 separate from the network 30 and the display position of the display data on the display portion 11 of the display device 10. Since the display data is directly transferred from the user terminal device 202 to the display device 10 through the data line 40, the data line 40 is prevented from being utilized by the terminal devices other than the user terminal device 202 and the display device 10, and the display data exchanged through the data line 40 is prevented from being acquired or changed. It is therefore possible to enhance the security for the data transfer through the data line 40.

In the embodiment described above, the data line 40 opened between the user terminal device 202 and the display device 10 can be a logical communication path through which the display data is transmitted. When the data communication path through which the display data is directly transmitted is opened between the display device 10 and the user terminal device 202, it is not necessary to provide a physical communication line separate from the network 30. Specifically, the data line 40 is provided, as a new logical communication path (logical line) separate from the network 30, in the physical communication line through which the network 30 passes, and thus it is possible to exchange the display data through the logical line that is logically separate from the network 30. Hence, since data exchanged through the network 30 and the display data transmitted through the data line 40 do not interfere with each other, it is possible to prevent the occurrence of transfer fluctuations and the like that cause variations in data transfer rate and data reception interval. It is therefore possible to more easily, efficiently and accurately transfer the display data from the user terminal device 202 to the display device 10.

In the embodiment described above, multimedia data, such as moving image data or voice data, in a format other than text format can be transmitted from the user terminal device 202 to the display device 10 through the dedicated data line 40 separate from the network 30. Hence, even when data (such as text data) exchanged through the network 30 and the display data (multimedia data in a format other than text format) transmitted through the data line 40 differ from each other in transmission characteristics, they do not interfere with each other, and thus it is possible to prevent the occurrence of transfer fluctuations and the like that cause variations in data transfer rate and data reception interval. It is therefore possible to more easily, efficiently and accurately transfer the multimedia data in a format other than text format from the user terminal device 202 to the display device 10. The display device 10 can associate, through the data ID, the multimedia data received through the data line 40 identified by the stream ID with the position information, and can further display the multimedia data in the display position on the display portion 11 indicated by the position information. Therefore, the display device 10 can structure and display the multimedia data received through the dedicated data line 40 in the display screen 111 on the display portion 11.

In the embodiment described above, the remark html fragmentation information (first information) transmitted to the display device 10 from the moderator terminal device 201 through the network 30 can be set for each of the users who use the information terminal devices 20, and can include the access right information indicating whether to permit the generation and the change of the display data and the user information indicating the user who is the owner of the display data. Therefore, the display device 10 can open the direct data line 40 through which the display data is transmitted, between the user terminal device 202 used by the user indicated by the access right information or the user information and the display device 10. Hence, it is unnecessary to provide a meshed communication path network in order to share information between the display device 10 and the information terminal devices 20; as necessary, the direct data line 40 is only opened between the display device 10 and the user terminal device 202 that transmits the display data. The display device 10 can associate, through the data ID, the display data received through the data line 40 with the position information, and can display the display data in the display position on the display portion 11 indicated by the position information. Since, through the access right information or the user information transmitted to the display device 10, the moderator terminal device 201 can indicate to the display device 10 which of the user terminal devices 202 the data line 40 should be opened with, the moderator terminal device 201 can control the opening of the data line 40 between the display device 10 and the user terminal device 202.

In the embodiment described above, the moderator terminal device 201 can transmit, to the display device 10 through the network 30, the remark html fragmentation information (first information) including the data ID, the position information, the access right information that is set for each of the users who use the information terminal devices 20 and that indicates whether to permit the generation and the change of the display data and the user information indicating the user who is the owner of the display data, and the display device 10 can display the display data on the display portion 11 based on the stream ID, the data ID, the position information, the user information and the access right information. Therefore, the display device 10 can associate, through the data ID, the display data received through the data line 40 identified by the stream ID with the user information, the access right information and the position information received from the moderator terminal device 201, determine, based on the user information and the access right information, whether to display the display data identified by the data ID and display the display data in the display position on the display portion 11 indicated by the position information. Hence, the display data transferred from the user terminal device 202 is managed by the data ID, and, with respect to the display data, individual pieces of display data displayed on the display portion 11 of the display device 10 are controlled according to the access right (that is, whether to permit the generation and the change of the display data) set for each of the users who use the information terminal devices 20. It is therefore possible to achieve smooth communication between a plurality of users based on their access rights.

In the embodiment described above, when the user who is allowed to generate and change the display data indicated by the access right information agrees with the user indicated by the user information, the display device 10 can display the display data on the display portion 11 based on the stream ID, the data ID and the position information. Hence, only when the user who is the owner of the display data identified by the data ID agrees with the user who has the access right (that is, whether to permit the generation and the change of the display data) for the display data, the display device 10 can display the display data on the display portion 11. Specifically, the display device 10 uses the data ID to identify the display data received through the data line 40 identified by the stream ID, and displays the identified display data in the display position on the display portion 11 indicated by the position information. It is therefore possible to achieve smooth communication between a plurality of users based on their access rights.

In the embodiment described above, the communication method can be provided that is used in an electronic conference in which a plurality of users participate. Thus, it is possible not only to reliably and easily manage, through the data ID, remarks (display data) presented to an imaginary conference room (that is, the electronic conference system 1) but also to control the remarks (display data) presented to the imaginary conference room according to the access right (that is, whether to permit the presentation and the modification of the remarks (display data)) that is set for each of the participants (users) participating in the imaginary conference room. It is therefore possible to achieve smooth communication between a plurality of users based on their access rights.

In the embodiment described above, the display device 10 and a plurality of information terminal devices 20 can communicate with each other in accordance with XMPP. It is therefore possible not only to perform real-time messaging (information exchange) between the display device 10 and the information terminal devices 20 (the moderator terminal device 201 and the user terminal devices 202) but also to easily and reliably associate, through the data ID, the data on which the messaging is performed in accordance with XMPP with the display data displayed on the display portion 11 of the display device 10.

In the embodiment described above, the opening of the data line 40 between the display device 10 and the user terminal device 202 and the transmission of the multimedia data from the user terminal device 202 to the display device 10 through the data line 40 can be performed in accordance with at least one protocol of XEP-0166 (Jingle), XEP-0167 (Jingle RTP Sessions) and XEP-0177 (Jingle Raw UDP Transport) among XMPP. Hence, even when NAT (network address translation) or a firewall is arranged in the networks 30 between the display device 10 and the user terminal devices 202, since multimedia data is transmitted through a data communication path separate from the networks 30, it is possible to reliably transfer the display data through the data line 40 without being affected such as by the interruption of the data transfer.

In the embodiment described above, the remark html fragmentation information (the first information and the second information) can be an html file obtained by extending the meta information. Here, the html file obtained by extending the meta information refers to data in a format that can be expressed by html compatible to the communication in accordance with XMPP, and the data includes meta information that is information (attribute information) related to the display data transferred through the data communication path opened between the display device 10 and the user terminal devices 202. As the meta information, the attribute information, such as the data ID, the position information, the stream ID, the access right information and the user information, that corresponds to the messaging in accordance with XMPP is included. Utilizing, as the meta information, the attribute information in this way (such as the data ID, the position information, the stream ID, the access right information and the user information) that corresponds to the messaging in accordance with XMPP is referred to as the extension. With this configuration, it is possible to map the meta information (such as the data ID, the position information, the stream ID, the user information and the access right information) included in the remark html fragmentation information (the first information and the second information) onto description in html format utilized in a web browser. Specifically, it is possible to make the meta information (such as the data ID, the position information, the stream ID, the user information and the access right information) included in the remark html fragmentation information (the first information and the second information) correspond to the display elements of html. Thus, it is possible to connect the messaging in accordance with XMPP to web and html.

In the embodiment described above, the remark html fragmentation information (first information) transmitted from the moderator terminal device 201 to the display device 10 through the network 30 and the remark html fragmentation information (second information) transmitted from the display device 10 to the user terminal device 202 through the network 30 can be fragmentation information constituting the structured display information (display information) for producing a display on the display portion 11 of the display device 10. Hence, for example, when the information terminal devices 20 (the moderator terminal device 201 and the user terminal devices 202) change part of information included in the structured display information for producing a display on the display portion 11 of the display device 10, if fragmentation information including the changed information is only transmitted, the display device 10 can modify the structured display information for producing a display on the display portion 11 based on the received fragmentation information. In other words, it is unnecessary to transmit the entire structured display information. Thus, since the amount of information exchanged between the display device 10 and the information terminal devices 20 (the moderator terminal device 201 and the user terminal devices 202) can be reduced, it is possible not only to reduce the time necessary for communication but also to significantly reduce a burden imposed on the networks 30 between the display device 10 and the information terminal devices 20 (the moderator terminal device 201 and the user terminal devices 202). It is therefore possible for a plurality of users participating in the communication to perform more convenient communication.

The above description is given based on the embodiment of the present invention. The present embodiment is illustrative. Many variations are possible by combining either the constituent components or different types of processing; those variations fall within the scope of the present invention and this is easily understood by one skilled in the art.

For example, although, in the embodiment described above, the multimedia data, such as moving image data or voice data, in a format other than text format is transmitted through the data line 40 (data communication path) separate from the networks 30, data in text format can also be transmitted.

Although, in the embodiment described above, the drawing mechanism of html is utilized as the structured display information (display information), DOM (document object model) may be utilized as the structured display information. DOM is a standardized API (application program interface) such as for html or XML (extensible markup language).

Although, in the embodiment described above, the display device 10 and a plurality of information terminal devices 20 communicate with each other in accordance with XMPP, the present invention is not limited to this. They may communicate with each other in accordance with a protocol similar to XMPP.

Although, in the embodiment described above, the opening of the data line 40 through which the display data (multimedia data) is transferred and the transmission of the display data (multimedia data) are performed in accordance with at least one protocol of Jingle (XEP-0166), Jingle-RTP (XEP-0167) and Jingle-UDP (XEP-0177) among XMPP, the present invention is not limited to this. Any protocol for establishing a communication path for exchanging data between two communication-capable terminal devices can be utilized.

In the embodiment described above, a plurality of display devices 10 that produce displays based on the structured display information may be provided at remote sites. In this case, the display devices preferably share the same structured display information. For example the display devices 10 can share the structured display information in accordance with XEP-0060 (Publish-Subscribe), which is an applied protocol of XMPP. When, as described above, the display devices at remote sites share the common screen, the information terminal devices 20 at the remote site where each of the display devices is located can also participate in the electronic conference system 1.

INDUSTRIAL APPLICABILITY

For example, the present invention can be applied to a chat system in which the writing and reading of and the reference of information can freely be performed within a community such as a family, a workplace or a school and in which a plurality of persons can make conversation in real time or an electronic system in which a plurality of users can present arguments and remarks in an imaginary conference room.

LIST OF REFERENCE SYMBOLS

1 Electronic conference system (multiuser communication system)
10 Display device
11 Display portion
111 Display screen
12 Communication portion
13 Storage portion
14 Control portion
20 Information terminal device
201 Moderator terminal device
202, 202a, 202b, 202c and 202d
   User terminal device
21 Terminal display portion (display portion)
22 Terminal communication portion (communication portion)
23 Terminal storage portion (storage portion)
24 Terminal control portion (control portion)
25 Terminal input portion (input portion)
30, 30a, 30b, 30c, 30d and 30e
   Network 30
40, 40a, 40b, 40c, 40d and 40e
   Data line (data communication path)

The invention claimed is:

1. A communication method between information terminal devices used by a plurality of users, and a display device displaying display data transmitted from the information terminal devices on a display portion, the communication method comprising the steps of:

transmitting, by a moderator terminal device included in the information terminal devices and managing the display data, to the display device through a network, first information including data ID information for identifying the display data and position information indicating a display position of the display data on the display portion;

opening a data communication path through which the display data is transmitted between the display device and a user terminal device included in the information terminal devices and transmitting the display data to the display device;

transmitting, by the display device, to the user terminal device through the network, second information including communication path identification information for identifying the data communication path and the data ID information;

transmitting, by the user terminal device, the display data to the display device through the data communication path identified by the communication path identification information; and displaying, by the display device, the display data on the display portion based on the communication path identification information, the data ID information and the position information.

2. The communication method of claim 1, wherein the data communication path is a logical communication path through which the display data is transmitted.

3. The communication method of claim 1, wherein the display data is multimedia data in a format other than text format.

4. The communication method of claim 1, wherein the first information further includes access right information that is set for each of the users using the information terminal devices and that indicates whether to permit generation and change of the display data, and in the step of opening the data communication path, the data communication path through which the display data is transmitted is opened between the display device and a user terminal device used by the user indicated by the access right information.

5. The communication method of claim 1, wherein the first information further includes user information indicating a user who is an owner of the display data, and in the step of opening the data communication path, the data communication path through which the display data is transmitted is opened between the display device and a user terminal device used by the user indicated by the user information.

6. The communication method of claim 1, wherein the first information further includes access right information that is set for each of the users using the information terminal devices and that indicates whether to permit generation and change of the display data and user information indicating a user who is an owner of the display data, and in the step of displaying the display data, the display device displays the display data on the display portion based on the communication path identification information, the data ID information, the position information, the user information and the access right information.

7. The communication method of claim 6, wherein, in the step of displaying the display data, when the user indicated by the access right information and permitted to generate and change the display data agrees with the user indicated by the user information, the display device displays the display data on the display portion based on the communication path identification information, the data ID information and the position information.

8. The communication method of claim 1, wherein the communication method is performed in an electronic conference in which the plurality of users participate.

9. The communication method of claim 1, wherein the display device and the information terminal devices communicate with each other in accordance with XMPP.

10. The communication method of claim 9, wherein the step of opening the data communication path and the step of transmitting, by the user terminal device, the display data to the display device through the data communication path are performed in accordance with at least one protocol of XEP-0166 (Jingle), XEP-0167 (Jingle RTP Sessions) and XEP-0177 (Jingle Raw UDP Transport) among XMPP.

11. The communication method of claim 9, wherein the first information and the second information are an html file obtained by extending meta information.

12. The communication method of claim 1, wherein the first information and the second information are fragmentation information constituting display information for producing a display on the display portion of the display device.

13. A display device comprising:

a communication portion that communicates through a network with a plurality of information terminal devices including a moderator terminal device managing display data and a user terminal device transmitting the display data, and that transmits, to the user terminal device, second information including communication path identification information for identifying a data communication path through which the display data is transmitted and a data ID information for identifying the display data;

a control portion that opens the data communication path between the communication portion and the user terminal device when the communication portion receives, from the moderator terminal device through the network, first information including the data ID information and position information indicating a display position of the display data and a display portion displaying the display data received by the communication portion from the user terminal device through the data communication path identified by the communication path identification information based on the communication path identification information, the data ID information and the position information.

14. The display device of claim 13, wherein the data communication path is a logical communication path through which the display data is transmitted from the user terminal device.

15. The display device of claim 13, wherein the display data is multimedia data in a format other than text format.

16. The display device of claim 13, wherein the first information further includes access right information that is set for each of the users using the information terminal devices and that indicates whether to permit generation and change of the display data, and, when the communication portion receives the first information from the moderator terminal device through the network, the control portion opens the data communication path through which the display data is transmitted between the communication portion and a user terminal device used by the user indicated by the access right information.

17. The display device of claim 13, wherein the first information further includes user information indicating a user who is an owner of the display data, and, when the communication portion receives the first information from the moderator terminal device through the network, the control portion opens the data communication path through which the display data is transmitted between the communication portion and a user terminal device used by the user indicated by the user right information.

18. The display device of claim 13, wherein the first information further includes access right information that is set for each of the users using the information terminal devices and that indicates whether to permit generation and change of the display data and user information indicating a user who is an owner of the display data, and the display portion displays the display data based on the communication path identification information, the data ID information, the position information, the user information and the access right information.

19. The display device of claim 18, wherein, when the user indicated by the access right information and permitted to generate and change the display data agrees with the user indicated by the user information, the display device displays the display data based on the communication path identification information, the data ID information and the position information.

20. The display device of claim 13, wherein the communication portion communicates with the information terminal devices in accordance with XMPP.

21. The display device of claim 20, wherein, in accordance with at least one protocol of XEP-0166 (Jingle), XEP-0167 (Jingle RTP Sessions) and XEP-0177 (Jingle Raw UDP Transport) among XMPP, the control portion opens the data communication path between the communication portion and the user terminal device, and the communication portion receives the display data from the user terminal device through the data communication path.

22. The display device of claim 20, wherein the first information and the second information are an html file obtained by extending meta information.

23. The display device of claim 13, wherein the first information and the second information are fragmentation information constituting display information for producing a display on the display portion.

24. A user terminal device comprising:
a control portion opening a data communication path, with a display device, through which display data displayed on the display device is transmitted; and
a communication portion transmitting the display data to the display device through the data communication path when second information including data ID information for identifying the display data and a communication path identification information for identifying the data communication path is received from the display device through a network.

25. The user terminal device of claim 24, wherein the data communication path is a logical communication path through which the display data displayed on the display device is transmitted.

26. The user terminal device of claim 24, wherein the display data is multimedia data in a format other than text format.

27. The user terminal device of claim 24, wherein the communication portion communicates with the display device in accordance with XMPP.

28. The user terminal device of claim 27, wherein, in accordance with at least one protocol of XEP-0166 (Jingle), XEP-0167 (Jingle RTP Sessions) and XEP-0177 (Jingle Raw UDP Transport) among XMPP, the control portion opens the data communication path identified by the communication path identification information between the communication portion and the display device, and the communication portion transmits the display data to the display device through the data communication path.

29. The user terminal device of claim 27, wherein the second information is an html file obtained by extending meta information.

30. The user terminal device of claim 24, wherein the second information is fragmentation information constituting display information for producing a display on the display portion.

31. A moderator terminal device comprising:
a control portion generating data ID information for identifying display data transmitted from a user terminal device to a display device and position information indicating a display position of the display data on a display portion of the display device; and
a communication portion transmitting, to the display device through a network, first information including data ID information and the position information,
wherein the user terminal device comprises a control portion opening a data communication path, with the display device, through which display data displayed on a display device is transmitted; and a communication portion transmitting the display data to the display device through the data communication path when second information including the data ID information for identifying the display data and a communication path identification information for identifying the data communication path is received from the display device through a network, and
wherein the display device comprises a communication portion that communicates through a network with a plurality of information terminal devices including a moderator terminal device managing display data and a user terminal device transmitting the display data, and that transmits, to the user terminal device, second information including communication path identification information for identifying a data communication path through which the display data is transmitted and a data ID information for identifying the display data; a control portion that opens the data communication path between the communication portion and the user terminal device when the communication portion receives, from the moderator terminal device through the network, first information including the data ID information and position information indicating a display position of the display data; and a display portion displaying the display data received by the communication portion from the user terminal device through the data communication path identified by the communication path identification information based on the communication path identification information, the data ID information and the position information.

32. The moderator terminal device of claim 31, wherein the control portion generates access right information that is set for each of users using a plurality of information terminal devices communicating with the display device and that indicates whether to permit generation and change of the display data, and the first information further includes the access right information.

33. The moderator terminal device of claim 31, wherein the control portion generates user information indicating a user who is an owner of the display data, and the first information further includes the user information.

34. The moderator terminal device of claim 31, wherein the communication portion communicates with the display device in accordance with XMPP.

35. The moderator terminal device of claim 34, wherein the first information is an html file obtained by extending meta information.

36. The moderator terminal device of claim 31, wherein the first information is fragmentation information constituting display information for producing a display on the display portion of the display device.

37. A multiuser communication system comprising:
information terminal devices that include the moderator terminal device of claim 31 and the user terminal device set forth in claim 31 and that are used by a plurality of users; and
a display device set forth in claim 31 that displays display data transmitted from the information terminal devices.

38. The multiuser communication system of claim 37, wherein the display data is multimedia data in a format other than text format.

39. The multiuser communication system of claim 37, wherein the multiuser communication system is an electronic conference system.

40. The multiuser communication system of claim 37, wherein the display device and the information terminal devices communicate with each other in accordance with XMPP.

41. The multiuser communication system of claim 40, wherein, in accordance with at least one protocol of XEP-0166 (Jingle), XEP-0167 (Jingle RTP Sessions) and XEP-0177 (Jingle Raw UDP Transport) among XMPP, a data communication path through which the display data is transmitted is opened between the display device and the user terminal device and the display data is transmitted from the user terminal device to the display device through the data communication path.

* * * * *